United States Patent
Wang

(10) Patent No.: US 9,412,175 B2
(45) Date of Patent: Aug. 9, 2016

(54) METHOD, APPARATUS AND COMPUTER PROGRAM PRODUCT FOR IMAGE SEGMENTATION

(71) Applicant: Nokia Corporation, Espoo (FI)

(72) Inventor: Tinghuai Wang, Tampere (FI)

(73) Assignee: Nokia Technologies Oy, Espoo (FI)

( * ) Notice: Subject to any disclaimer, the term of this patent is extended or adjusted under 35 U.S.C. 154(b) by 36 days.

(21) Appl. No.: 14/585,328

(22) Filed: Dec. 30, 2014

(65) Prior Publication Data

US 2015/0235374 A1 Aug. 20, 2015

(30) Foreign Application Priority Data

Feb. 20, 2014 (GB) .................................. 1402972.2

(51) Int. Cl.
- G06K 9/62 (2006.01)
- G06T 7/00 (2006.01)
- G06K 9/46 (2006.01)
- G06K 9/52 (2006.01)

(52) U.S. Cl.
CPC ............ *G06T 7/0081* (2013.01); *G06K 9/4604* (2013.01); *G06K 9/52* (2013.01); *G06K 9/6256* (2013.01); *G06K 9/6267* (2013.01); *G06K 2009/4666* (2013.01)

(58) Field of Classification Search
CPC ................... G06T 7/0081; G06T 2207/20144; G06T 7/0083; G06K 9/34; G06K 9/6267
See application file for complete search history.

(56) References Cited

U.S. PATENT DOCUMENTS

| 8,131,076 B2 | 3/2012 | Jolly et al. |
| 2011/0293180 A1 | 12/2011 | Criminisi et al. |
| 2012/0294519 A1* | 11/2012 | He ........................... G06K 9/34 382/164 |
| 2013/0022251 A1 | 1/2013 | Chen et al. |
| 2013/0077842 A1 | 3/2013 | El-Zehiry et al. |
| 2013/0156314 A1 | 6/2013 | Pham |
| 2014/0153829 A1* | 6/2014 | Pham ....................... G06K 9/34 382/173 |

OTHER PUBLICATIONS

Mortensen et al., "Intelligent Scissors For Image Composition", Proceedings of the 22nd annual conference on Computer graphics and interactive techniques, 1995, pp. 191-198.

Ruzon et al., "Alpha Estimation in Natural Images", IEEE Conference on Computer Vision and Pattern Recognition, vol. 1, Jun. 2000, 8 pages.

(Continued)

*Primary Examiner* — Stephen R Koziol
*Assistant Examiner* — Shaghayegh Azima
(74) *Attorney, Agent, or Firm* — Nokia Technologies Oy

(57) ABSTRACT

In an example embodiment, a method, apparatus and computer program product are provided. The method includes facilitating receipt of a plurality of superpixels of an input image and an object selection input for selecting part of a foreground object in the input image. The method includes determining first set of superpixels as first set of foreground seeds and second set of superpixels as first set of background seeds. The method includes filtering the first set of background seeds to generate second set of background seeds based on geodesic distances. The method includes adding superpixels of first set of unclassified superpixels to the second set of background seeds to generate third set of background seeds, and adding superpixels of second set of unclassified superpixels to the third set of background seeds to generate fourth set of background seeds based on applying a classifier on the second set of unclassified superpixels.

21 Claims, 13 Drawing Sheets

(56) References Cited

OTHER PUBLICATIONS

Boykov et al., "Interactive Graph Cuts for Optimal Boundary and Region Segmentation of Objects in N-D Images", International Conference on Computer Vision, vol. 1, Jul. 2001, pp. 105-112.

Rother et al., "Grab Cut: Interactive Foreground Extraction Using Iterated Graph Cuts", Proceedings of ACM Transactions on Graphics, vol. 23, No. 3, Aug. 2004, pp. 309-314.

Wang et al., "Touchcut: Single-Touch Object Segmentation Driven by Level Set Methods", IEEE International Conference on Acoustics, Speech and Signal Processing, Mar. 25-30, 2012, 4 pages.

El-Zehiry et al., "A Splice-guided Data Driven Interactive Editing", IEEE 10th International Symposium on Biomedical Imaging, Apr. 7-11, 2013, 4 pages.

Bai et al., "A Geodesic Framework for Fast Interactive Image and Video Segmentation and Matting", IEEE 11th International Conference on Computer Vision, Oct. 14-21, 2007, 8 pages.

Felzenszwalb et al., "Efficient Graph-Based Image Segmentation", International Journal of Computer Vision, vol. 59, No. 2, Sep. 2004, pp. 1-26.

Search Report received for corresponding United Kingdom Patent Application No. 1402972.2, dated Aug. 28, 2014, 4 pages.

Chen et al., "Adaptive Figure-Ground Classification", IEEE Conference on Computer Vision and Pattern Recognition, Jun. 16-21, 2012, pp. 654-661.

Yang et al., "Saliency Detection Via Graph-Based Manifold Ranking", IEEE Conference on Computer Vision and Pattern Recognition, Jun. 23-28, 2013, pp. 3166-3173.

Extended European Search Report received for corresponding European Patent Application No. 15155157.9, dated Jul. 16, 2015, 6 pages.

Ning et al., "Interactive Image Segmentation by Maximal Similarity Based Region Merging", Pattern Recognition, vol. 43, No. 2, Feb. 2010, pp. 445-456.

Chen et al., "A Multi-Label Interactive Image Segmentation Method Based on Region Merging", International Conference on Mechatronic Science, Electric Engineering and Computer, Aug. 19-22, 2011, pp. 2336-2340.

Price et al., "Geodesic Graph Cut for Interactive Image Segmentation", IEEE Conference on Computer Vision and Pattern Recognition, Jun. 13-18, 2010, pp. 3161-3168.

Song et al., "Interactive Segmentation With Seed Expansion", Asia-Pacific Signal and Information Processing Association Annual Summit and Conference, Dec. 9, 2014, 4 pages.

\* cited by examiner

METHOD, APPARATUS AND COMPUTER PROGRAM PRODUCT FOR IMAGE SEGMENTATION

TECHNICAL FIELD

Various implementations relate generally to method, apparatus, and computer program product for image segmentation of digital images.

BACKGROUND

Various electronic devices, for example, cameras, mobile phones, and other multimedia devices are widely used for capturing digital images. Image segmentation is performed on a digital image in order to partition the digital image into two or more sets of pixel regions, for example a foreground can be separated from a background of the digital image. Some techniques of the image segmentation involves receiving user inputs for selection of one or more objects belonging to the foreground and/or the background in the digital image, and then performing the image segmentation based on the user input. Such user inputs are provided in different formats, for example, by drawing scribbles on the digital image displayed on touch screen based electronic devices, or other forms of selections of objects in the digital image such as tapping or swiping any part of the digital image. Existing scribble-based image segmentation methods require user-specified seeds segmentation of the foreground and the background thereby making the segmentation process cumbersome for the user.

SUMMARY OF SOME EMBODIMENTS

Various aspects of example embodiments are set out in the claims.

In a first aspect, there is provided a method comprising: facilitating receipt of a plurality of superpixels of an input image; facilitating receipt of an object selection input for selecting at least a part of a foreground object in the input image; determining a first set of superpixels of the plurality of superpixels as a first set of foreground seeds based on the object selection input; determining a second set of superpixels of the plurality of superpixels as a first set of background seeds, the second set of superpixels comprised within a pre-determined region of the input image; filtering the first set of background seeds to generate a second set of background seeds based on geodesic distances between the first set of foreground seeds and the first set of background seeds, a geodesic distance of the geodesic distances between a foreground seed and a background seed being based on a spatial distance and an appearance metric between the foreground seed and the background seed; adding one or more superpixels of a first set of unclassified superpixels to the second set of background seeds to generate a third set of background seeds, the one or more superpixels of the first set of unclassified superpixels added based on the geodesic distances of superpixels of the first set of unclassified superpixels from the first set of foreground seeds and from the second set of background seeds, wherein the first set of unclassified superpixels comprises superpixels of the plurality of superpixels other than the first set of foreground seeds and the second set of background seeds; and adding one or more superpixels of a second set of unclassified superpixels to the third set of background seeds to generate a fourth set of background seeds based on applying a classifier on the second set of unclassified superpixels, wherein the second set of unclassified superpixels comprises superpixels of the plurality of superpixels other than the first set of foreground seeds and the third set of background seeds.

In a second aspect, there is provided an apparatus comprising at least one processor; and at least one memory comprising computer program code, the at least one memory and the computer program code configured to, with the at least one processor, cause the apparatus to perform at least: facilitate receipt of a plurality of superpixels of an input image; facilitate receipt of an object selection input for selecting at least a part of a foreground object in the input image; determine a first set of superpixels of the plurality of superpixels as a first set of foreground seeds based on the object selection input; determine a second set of superpixels of the plurality of superpixels as a first set of background seeds, the second set of superpixels comprised within a pre-determined region of the input image; filter the first set of background seeds to generate a second set of background seeds based on geodesic distances between the first set of foreground seeds and the first set of background seeds, a geodesic distance of the geodesic distances between a foreground seed and a background seed being based on a spatial distance and an appearance metric between the foreground seed and the background seed; add one or more superpixels of a first set of unclassified superpixels to the second set of background seeds to generate a third set of background seeds, the one or more superpixels of the first set of unclassified superpixels added based on the geodesic distances of superpixels of the first set of unclassified superpixels from the first set of foreground seeds and from the second set of background seeds, wherein the first set of unclassified superpixels comprises superpixels of the plurality of superpixels other than the first set of foreground seeds and the second set of background seeds; adding one or more superpixels of a second set of unclassified superpixels to the third set of background seeds to generate a fourth set of background seeds based on applying a classifier on the second set of unclassified superpixels, wherein the second set of unclassified superpixels comprises superpixels of the plurality of superpixels other than the first set of foreground seeds and the third set of background seeds.

In a third aspect, there is provided a computer program product comprising at least one computer-readable storage medium, the computer-readable storage medium comprising a set of instructions, which, when executed by one or more processors, cause an apparatus to at least perform: facilitate receipt of a plurality of superpixels of an input image; facilitate receipt of an object selection input for selecting at least a part of a foreground object in the input image; determine a first set of superpixels of the plurality of superpixels as a first set of foreground seeds based on the object selection input; determine a second set of superpixels of the plurality of superpixels as a first set of background seeds, the second set of superpixels comprised within a pre-determined region of the input image; filter the first set of background seeds to generate a second set of background seeds based on geodesic distances between the first set of foreground seeds and the first set of background seeds, a geodesic distance of the geodesic distances between a foreground seed and a background seed being based on a spatial distance and an appearance metric between the foreground seed and the background seed; add one or more superpixels of a first set of unclassified superpixels to the second set of background seeds to generate a third set of background seeds, the one or more superpixels of the first set of unclassified superpixels added based on the geodesic distances of superpixels of the first set of unclassified superpixels from the first set of foreground seeds and from the second set of background seeds, wherein the first set of unclassified superpixels comprises superpixels of the plurality of superpixels other than the first set of foreground seeds and the second set of background seeds; and add one or more superpixels of a second set of unclassified superpixels to the third set of background seeds to generate a fourth set of background seeds based on applying a classifier on the second set of unclassified superpixels, wherein the second set of unclassified superpixels comprises superpixels of the plurality of superpixels other than the first set of foreground seeds and the third set of background seeds.

In a fourth aspect, there is provided an apparatus comprising: means for facilitating receipt of a plurality of superpixels of an input image; means for facilitating receipt of an object selection input for selecting at least a part of a foreground object in the input image; means for determining a first set of superpixels of the plurality of superpixels as a first set of foreground seeds based on the object selection input; means for determining a second set of superpixels of the plurality of superpixels as a first set of background seeds, the second set of superpixels comprised within a pre-determined region of the input image; means for filtering the first set of background seeds to generate a second set of background seeds based on geodesic distances between the first set of foreground seeds and the first set of background seeds, a geodesic distance of the geodesic distances between a foreground seed and a background seed being based on a spatial distance and an appearance metric between the foreground seed and the background seed; means for adding one or more superpixels of a first set of unclassified superpixels to the second set of background seeds to generate a third set of background seeds, the one or more superpixels of the first set of unclassified superpixels added based on the geodesic distances of superpixels of the first set of unclassified superpixels from the first set of foreground seeds and from the second set of background seeds, wherein the first set of unclassified superpixels comprises superpixels of the plurality of superpixels other than the first set of foreground seeds and the second set of background seeds; and means for adding one or more superpixels of a second set of unclassified superpixels to the third set of background seeds to generate a fourth set of background seeds based on applying a classifier on the second set of unclassified superpixels, wherein the second set of unclassified superpixels comprises superpixels of the plurality of superpixels other than the first set of foreground seeds and the third set of background seeds.

In a fifth aspect, there is provided a computer program comprising program instructions which when executed by an apparatus, cause the apparatus to: facilitate receipt of a plurality of superpixels of an input image; facilitate receipt of an object selection input for selecting at least a part of a foreground object in the input image; determine a first set of superpixels of the plurality of superpixels as a first set of foreground seeds based on the object selection input; determine a second set of superpixels of the plurality of superpixels as a first set of background seeds, the second set of superpixels comprised within a pre-determined region of the input image; filter the first set of background seeds to generate a second set of background seeds based on geodesic distances between the first set of foreground seeds and the first set of background seeds, a geodesic distance of the geodesic distances between a foreground seed and a background seed being based on a spatial distance and an appearance metric between the foreground seed and the background seed; add one or more superpixels of a first set of unclassified superpixels to the second set of background seeds to generate a third set of background seeds, the one or more superpixels of the first set of unclassified superpixels added based on the geodesic distances of superpixels of the first set of unclassified superpixels from the first set of foreground seeds and from the second set of background seeds, wherein the first set of unclassified superpixels comprises superpixels of the plurality of superpixels other than the first set of foreground seeds and the second set of background seeds; and add one or more superpixels of a second set of unclassified superpixels to the third set of background seeds to generate a fourth set of background seeds based on applying a classifier on the second set of unclassified superpixels, wherein the second set of unclassified superpixels comprises superpixels of the plurality of superpixels other than the first set of foreground seeds and the third set of background seeds.

BRIEF DESCRIPTION OF THE FIGURES

Various embodiments are illustrated by way of example, and not by way of limitation, in the figures of the accompanying drawings in which.

DETAILED DESCRIPTION

Example embodiments and their potential effects are understood by referring to FIGS. 1 through 6A-6B of the drawings.

Figure 1:
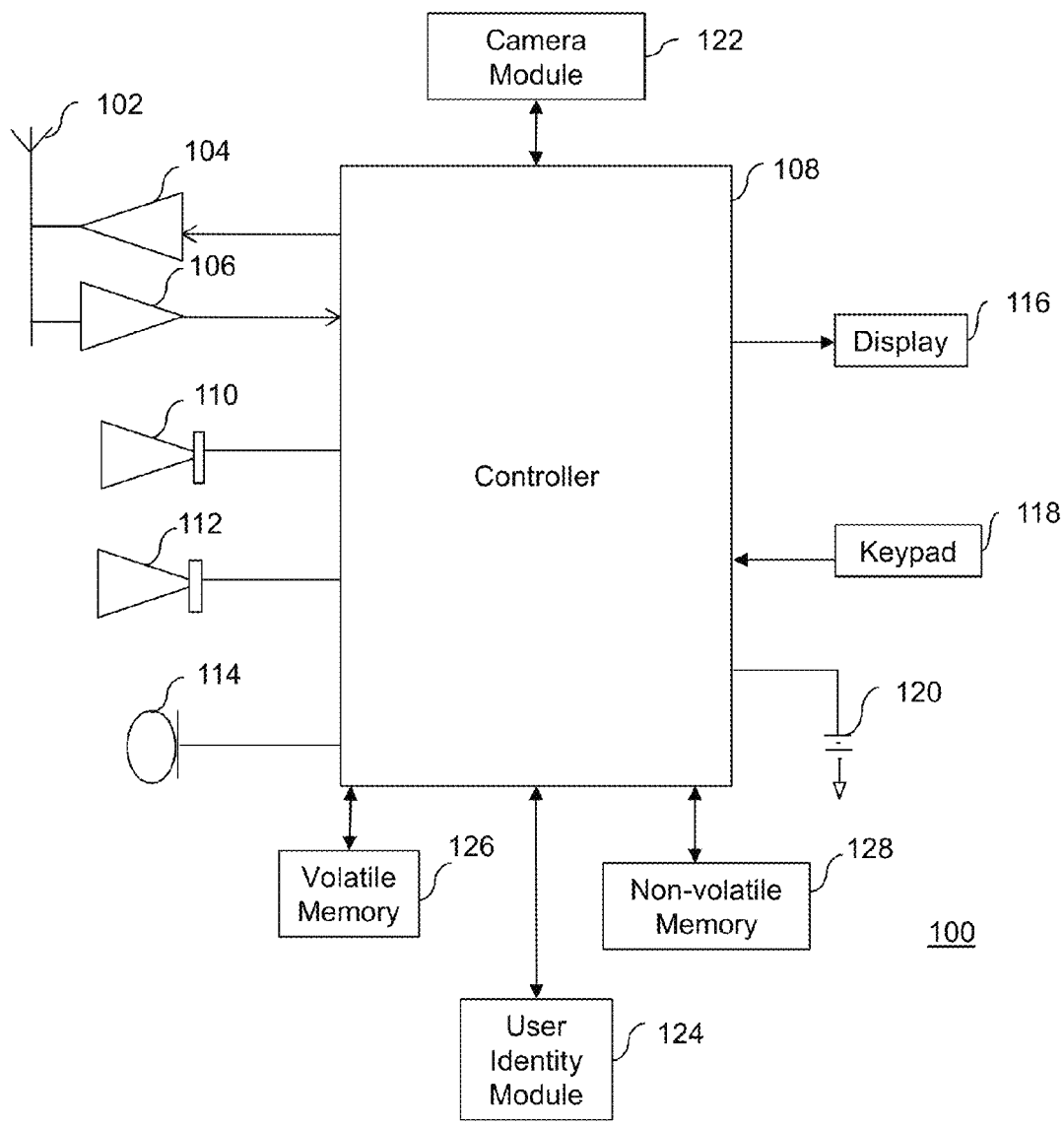
FIG. 1 illustrates a device, in accordance with an example embodiment.

FIG. 1 illustrates a device 100 in accordance with an example embodiment. It should be understood, however, that the device 100 as illustrated and hereinafter described is merely illustrative of one type of device that may benefit from various embodiments, therefore, should not be taken to limit the scope of the embodiments. As such, it should be appreciated that at least some of the components described below in connection with the device 100 may be optional and thus in an example embodiment may include more, less or different components than those described in connection with the example embodiment of FIG. 1. The device 100 could be any of a number of types of touch screen based mobile electronic devices, for example, portable digital assistants (PDAs), mobile televisions, gaming devices, cellular phones, all types of computers (for example, laptops, mobile computers or desktops), cameras, mobile digital assistants, or any combination of the aforementioned, and other types of communications devices.

The device 100 may include an antenna 102 (or multiple antennas) in operable communication with a transmitter 104 and a receiver 106. The device 100 may further include an apparatus, such as a controller 108 or other processing device that provides signals to and receives signals from the transmitter 104 and receiver 106, respectively. The signals may include signaling information in accordance with the air interface standard of the applicable cellular system, and/or may also include data corresponding to user speech, received data and/or user generated data. In this regard, the device 100 may be capable of operating with one or more air interface standards, communication protocols, modulation types, and access types. By way of illustration, the device 100 may be capable of operating in accordance with any of a number of first, second, third and/or fourth-generation communication protocols or the like. For example, the device 100 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA1000, wideband CDMA (WCDMA) and time division-synchronous CDMA (TD-SCDMA), with 3.9G wireless communication protocol such as evolved universal terrestrial radio access network (E-UTRAN), with fourth-generation (4G) wireless communication protocols, or the like. As an alternative (or additionally), the device 100 may be capable of operating in accordance with non-cellular communication mechanisms. For example, computer networks such as the Internet, local area network, wide area networks, and the like; short range wireless communication networks such as include Bluetooth® networks, Zigbee® networks, Institute of Electric and Electronic Engineers (IEEE) 802.11x networks, and the like; wireline telecommunication networks such as public switched telephone network (PSTN).

The controller 108 may include circuitry implementing, among others, audio and logic functions of the device 100. For example, the controller 108 may include, but are not limited to, one or more digital signal processor devices, one or more microprocessor devices, one or more processor(s) with accompanying digital signal processor(s), one or more processor(s) without accompanying digital signal processor(s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 100 are allocated between these devices according to their respective capabilities. The controller 108 thus may also include the functionality to convolutionally encode and interleave message and data prior to modulation and transmission. The controller 108 may additionally include an internal voice coder, and may include an internal data modem. Further, the controller 108 may include functionality to operate one or more software programs, which may be stored in a memory. For example, the controller 108 may be capable of operating a connectivity program, such as a conventional web browser. The connectivity program may then allow the device 100 to transmit and receive web content, such as location-based content and/or other web page content, according to a Wireless Application Protocol (WAP), Hypertext Transfer Protocol (HTTP) and/or the like. In an example embodiment, the controller 108 may be embodied as a multi-core processor such as a dual or quad core processor. However, any number of processors may be included in the controller 108.

The device 100 may also comprise a user interface including an output device such as a ringer 110, an earphone or speaker 112, a microphone 114, a display 116, and a user input interface, which may be coupled to the controller 108. The user input interface, which allows the device 100 to receive data, may include any of a number of devices allowing the device 100 to receive data, such as a keypad 118, a touch display, a microphone or other input device. In embodiments including the keypad 118, the keypad 118 may include numeric (0-9) and related keys (#, *), and other hard and soft keys used for operating the device 100. Alternatively or additionally, the keypad 118 may include a conventional QWERTY keypad arrangement. The keypad 118 may also include various soft keys with associated functions. In addition, or alternatively, the device 100 may include an interface device such as a joystick or other user input interface. The device 100 further includes a battery 120, such as a vibrating battery pack, for powering various circuits that are used to operate the device 100, as well as optionally providing mechanical vibration as a detectable output.

In an example embodiment, the device 100 includes a media capturing element, such as a camera, video and/or audio module, in communication with the controller 108. The media capturing element may be any means for capturing an image, video and/or audio for storage, display or transmission. In an example embodiment in which the media capturing element is a camera module 122, the camera module 122 may include a digital camera capable of forming a digital image file from a captured image. As such, the camera module 122 includes all hardware, such as a lens or other optical component(s), and software for creating a digital image file from a captured image. Alternatively, the camera module 122 may include the hardware needed to view an image, while a memory device of the device 100 stores instructions for execution by the controller 108 in the form of software to create a digital image file from a captured image. In an example embodiment, the camera module 122 may further include a processing element such as a co-processor, which assists the controller 108 in processing image data and an encoder and/or decoder for compressing and/or decompressing image data. The encoder and/or decoder may encode and/or decode according to a JPEG standard format or another like format. For video, the encoder and/or decoder may employ any of a plurality of standard formats such as, for example, standards associated with H.261, H.262/MPEG-2, H.263, H.264, H.264/MPEG-4, MPEG-4, and the like. In some cases, the camera module 122 may provide live image data to the display 116. Moreover, in an example embodiment, the display 116 may be located on one side of the device 100 and the camera module 122 may include a lens positioned on the opposite side of the device 100 with respect to the display 116 to enable the camera module 122 to capture images on one side of the device 100 and present a view of such images to the user positioned on the other side of the device 100.

The device 100 may further include a user identity module (UIM) 124. The UIM 124 may be a memory device having a processor built in. The UIM 124 may include, for example, a subscriber identity module (SIM), a universal integrated circuit card (UICC), a universal subscriber identity module (USIM), a removable user identity module (R-UIM), or any other smart card. The UIM 124 typically stores information elements related to a mobile subscriber. In addition to the UIM 124, the device 100 may be equipped with memory. For example, the device 100 may include volatile memory 126, such as volatile random access memory (RAM) including a cache area for the temporary storage of data. The device 100 may also include other non-volatile memory 128, which may be embedded and/or may be removable. The non-volatile memory 128 may additionally or alternatively comprise an electrically erasable programmable read only memory (EEPROM), flash memory, hard drive, or the like. The memories may store any number of pieces of information, and data, used by the device 100 to implement the functions of the device 100.

Figure 2:
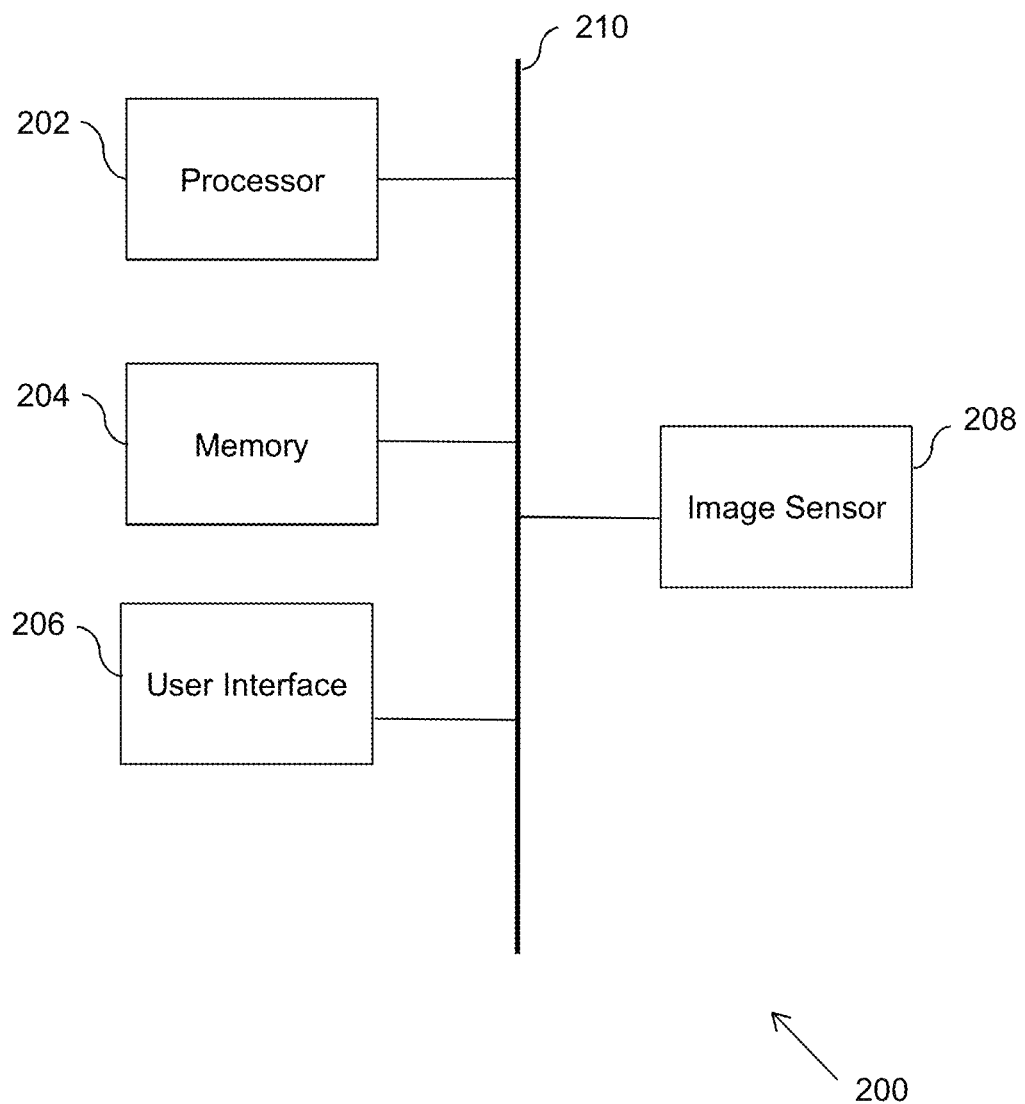
FIG. 2 illustrates an apparatus for image segmentation of digital images, in accordance with an example embodiment.

FIG. 2 illustrates an apparatus 200 for image segmentation of digital images, in accordance with an example embodiment. The apparatus 200 may be employed, for example, in the device 100 of FIG. 1. However, it should be noted that the apparatus 200, may also be employed on a variety of other devices both mobile and fixed, and therefore, embodiments should not be limited to application on devices such as the device 100 of FIG. 1. Alternatively, embodiments may be employed on a combination of devices including, for example, those listed above. Accordingly, various embodiments may be embodied wholly at a single device, for example, the device 100 or in a combination of devices. Furthermore, it should be noted that the devices or elements described below may not be mandatory and thus some may be omitted in certain embodiments.

The apparatus 200 includes or otherwise is in communication with at least one processor 202 and at least one memory 204. Examples of the at least one memory 204 include, but are not limited to, volatile and/or non-volatile memories. Some examples of the volatile memory include, but are not limited to, random access memory, dynamic random access memory, static random access memory, and the like. Some examples of the non-volatile memory include, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the apparatus 200 to carry out various functions in accordance with various example embodiments. For example, the memory 204 may be configured to buffer input data comprising media content for processing by the processor 202. Additionally or alternatively, the memory 204 may be configured to store instructions for execution by the processor 202.

An example of the processor 202 may include the controller 108. The processor 202 may be embodied in a number of different ways. The processor 202 may be embodied as a multi-core processor, a single core processor; or combination of multi-core processors and single core processors. For example, the processor 202 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 204 or otherwise accessible to the processor 202. Alternatively or additionally, the processor 202 may be configured to execute hard coded functionality. As such, whether configured by hardware or software methods, or by a combination thereof, the processor 202 may represent an entity, for example, physically embodied in circuitry, capable of performing operations according to various embodiments while configured accordingly. For example, if the processor 202 is embodied as two or more of an ASIC, FPGA or the like, the processor 202 may be specifically configured hardware for conducting the operations described herein. Alternatively, as another example, if the processor 202 is embodied as an executor of software instructions, the instructions may specifically configure the processor 202 to perform the algorithms and/or operations described herein when the instructions are executed. However, in some cases, the processor 202 may be a processor of a specific device, for example, a mobile terminal or network device adapted for employing embodiments by further configuration of the processor 202 by instructions for performing the algorithms and/or operations described herein. The processor 202 may include, among other things, a clock, an arithmetic logic unit (ALU) and logic gates configured to support operation of the processor 202.

A user interface 206 may be in communication with the processor 202. Examples of the user interface 206 include, but are not limited to, input interface and/or output interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 206 may include, among other devices or elements, any or all of a speaker, a microphone, a display, and a keyboard, touch screen, or the like. In this regard, for example, the processor 202 may comprise user interface circuitry configured to control at least some functions of one or more elements of the user interface 206, such as, for example, a speaker, ringer, microphone, display, and/or the like. The processor 202 and/or user interface circuitry comprising the processor 202 may be configured to control one or more functions of one or more elements of the user interface 206 through computer program instructions, for example, software and/or firmware, stored on a memory, for example, the at least one memory 204, and/or the like, accessible to the processor 202.

In an example embodiment, the apparatus 200 may include an electronic device. Some examples of the electronic device include communication device, media capturing device with or without communication capabilities, computing devices, and the like. Some examples of the electronic device may include a mobile phone, a personal digital assistant (PDA), and the like. Some examples of computing device may include a laptop, a personal computer, and the like. In an example embodiment, the electronic device may include a user interface, for example, the user interface 206, having user interface circuitry and user interface software configured to facilitate a user to control at least one function of the electronic device through use of a display and further configured to respond to user inputs. In an example embodiment, the electronic device may include a display circuitry configured to display at least a portion of the user interface 206 of the electronic device. The display and display circuitry may be configured to facilitate the user to control at least one function of the electronic device.

In an example embodiment, the electronic device may be embodied as to include a transceiver. The transceiver may be any device operating or circuitry operating in accordance with software or otherwise embodied in hardware or a combination of hardware and software. For example, the processor 202 operating under software control, or the processor 202 embodied as an ASIC or FPGA specifically configured to perform the operations described herein, or a combination thereof, thereby configures the apparatus or circuitry to perform the functions of the transceiver. The transceiver may be configured to receive media content. Examples of the media content may include audio content, video content, data, and a combination thereof.

In an example embodiment, the electronic device may be embodied as to include an image sensor, such as an image sensor 208. Though only one image sensor 208 is shown in the example representation of FIG. 2, the electronic device may include more than one image sensor. The image sensor 208 may be in communication with the processor 202 and/or other components of the apparatus 200. The image sensor 208 may be in communication with other imaging circuitries and/or software, and is configured to capture digital images or to capture video or other graphic media. The image sensor 208 and other circuitries, in combination, may be examples of at least one camera module such as the camera module 122 of the device 100.

These components (202-208) may communicate to each other via a centralized circuit system 210 to facilitate image segmentation. The centralized circuit system 210 may be various devices configured to, among other things, provide or enable communication between the components (202-208) of the apparatus 200. In certain embodiments, the centralized circuit system 210 may be a central printed circuit board (PCB) such as a motherboard, main board, system board, or logic board. The centralized circuit system 210 may also, or alternatively, include other printed circuit assemblies (PCAs) or communication channel media.

In an example embodiment, the apparatus 200 is caused to perform image segmentation of digital images. In this example embodiment, the processor 202 is configured to, with the content of the memory 204, and optionally with other components described herein, to cause the apparatus 200 to facilitate receipt of a plurality of superpixels of an input image. In an example embodiment, the apparatus 200 may be caused to facilitate receipt of the plurality of superpixels of the input image. In an example embodiment, apparatus 200 may be caused to segment the input image into the plurality of superpixels. In this example embodiment, the input image is segmented into the plurality of superpixels using a segmentation algorithm. Herein, the 'superpixels' refers to sets of pixels, where each set of pixels (a superpixel) is formed based on common properties, for example color, intensity, or texture. In an example embodiment, the input image is associated with a scene including one or more objects, for example one or more background objects and one or more foreground objects. In an example, the input image is captured by the image sensor 208 present or otherwise accessible to the apparatus 200. In some other examples, the input image and plurality of superpixels may be prerecorded or stored in the apparatus 200, or may be received from sources external to the apparatus 200. In such example embodiments, the apparatus 200 is caused to receive the input image and/or the plurality of superpixels from external storage medium such as DVD, Compact Disk (CD), flash drive, memory card, or from external storage locations through Internet, Bluetooth®, and the like. In an example embodiment, a processing means may be configured to facilitate receipt of the plurality of superpixels of the input image. An example of the processing means may include the processor 202, which may be an example of the controller 108, and the image sensor 208.

In an example embodiment, the apparatus 200 is caused to facilitate receipt of an object selection input for selecting at least a part of a foreground object in the input image. In an example embodiment, a processing means may be configured to facilitate receipt of the object selection input. An example of the processing means may include the processor 202, which may be an example of the controller 108. In an example embodiment, the object selection input is received from a user. In this example embodiment, the user may provide the object selection input in form of scribbles as the object selection input on the foreground object in the input image (for example, by scribbling onto the display 116 of a touch screen based mobile device) in order to select at least the part of the foreground object. For instance, the object selection input may be provided either through finger input of the user or by using a stylus onto the display 116, or by providing a command input, voice input or any gesture based input, or input through keypads, mouse, trackball and the like. In some other example embodiments, the object selection input may be provided by automatic or semi-automatic means, or based on a set of pre-defined instructions or based on time-bound instructions. In some other example embodiments, the object selection input on the input image may be prerecorded or stored in the apparatus 200, or may be received from sources external to the apparatus 200.

In an example embodiment, the apparatus 200 is caused to determine a first set of superpixels of the plurality of superpixels as a first set of foreground seeds (FS1) based on the object selection input. In an example embodiment, the first set of superpixels is the superpixels in the input image that intersect with the object selection input. Herein, the first set of superpixels is classified as part of the foreground of the input image, and hence also termed as 'foreground seeds'. Herein, the first set of superpixels that is classified as part of the foreground is collectively referred to as the first set of foreground seeds FS1. It should be noted that the superpixels and seeds may be same, and the superpixels that are classified as part of the foreground are called as the foreground seeds. Some examples of determination of the first set of foreground seeds FS1 are provided later in the description. In an example embodiment, a processing means may be configured to generate the first set of foreground seeds FS1. An example of the processing means may include the processor 202, which may be an example of the controller 108.

In an example embodiment, the apparatus 200 is caused to determine a second set of superpixels of the plurality of superpixels as a first set of background seeds (BS1). In an example embodiment, the second set of superpixels is the superpixels lying within the pre-determined region (for example, image regions in proximity with a border of the input image) of the input image. Herein, the second set of superpixels is classified as part of the background of the input image, and hence also termed as 'background seeds'. Herein, the second set of superpixels that is classified as part of the background is collectively referred to as the first set of background seeds BS1. It should be noted that superpixels and seeds may be same, and the superpixels that are classified as part of the background are called as the background seeds. Some examples of determination of the first set of background seeds BS1 are provided later in the description. In some other example embodiments, the pre-determined region may not necessarily be the image regions in proximity with the border of the input image, and may include any image region of the input image. In an example embodiment, a processing means may be configured to determine the first set of background seeds BS1. An example of the processing means may include the processor 202, which may be an example of the controller 108.

In an example embodiment, the apparatus 200 is caused to filter the first set of background seeds FS1 to generate a second set of background seeds (BS2) based on geodesic distances between the first set of foreground seeds FS1 and the first set of background seeds BS1. In an example embodiment, the 'geodesic distances' refers to least distances between a plurality of pairs of nodes, for example between the nodes from the first set of foreground seeds FS1 and nodes from the first set of background seeds BS1. In this example embodiment, a geodesic distance (of the geodesic distances) between a foreground seed (of FS1) and a background seed (of BS1) is based on a spatial distance and an appearance metric between the foreground seed and the background seed. In an example embodiment of filtering the first set of background seeds, the apparatus 200 is caused to calculate geodesic distances of seeds of the first set of background seeds BS1 from one or more seeds of the first set of foreground seeds FS1. In this example embodiment of filtering the first set of background seeds BS1, the apparatus 200 is caused to rank the seeds of the first set of background seeds BS1 based on the geodesic distances of the seeds of the first set of background seeds BS1. In an example, suitable techniques, including but not limited to, a ranking algorithm can be used to rank seeds of the first set of background seeds BS1. In an example, the seeds of the first set of background seeds BS1 are ranked based on a descending order of the geodesic distances. In an example embodiment, a processing means may be configured to calculate geodesic distances of the seeds of the first set of background seeds BS1 from one or more seeds of the first set of foreground seeds FS1. An example of the processing means may include the processor 202, which may be an example of the controller 108. In an example embodiment, a processing means may be configured to rank seeds of the first set of background seeds BS1 based on the geodesic distances of the seeds of the first set of background seeds BS1. An example of the processing means may include the processor 202, which may be an example of the controller 108.

In this example embodiment of filtering the first set of background seeds BS1, the apparatus 200 is caused to determine a first threshold percentage of the first set of background seeds BS1 as the second set of background seeds BS2 based on the ranking of the seeds of the first set of background seeds BS1. Herein, the 'first threshold percentage' refers to a percentile number on basis of which the second set of background seeds BS2 (that have a higher likelihood of belonging to the background of the input image) may be generated from the BS1 such that noisy superpixels (that may belong to the foreground of the input image) of the BS1 may be excluded from the BS1 to generate the BS2. In an example, the first threshold percentage may be a pre-determined value. In this example, top-ranked seeds of the first set of background seeds BS1 equal to a first threshold percentage of the total number of superpixels are determined to be the second set of background seeds BS2. In this example, bottom-ranked seeds of the first set of background seeds BS1 are determined to be the noisy superpixels and are excluded from the first set of background seeds BS1. In an example embodiment, a processing means may be configured to determine the first threshold percentage of the first set of background seeds BS1 as the second set of background seeds BS2 based on the ranking of the seeds of the first set of background seeds BS1. An example of the processing means may include the processor 202, which may be an example of the controller 108.

An example embodiment of the generation of the BS2 from BS1 can be explained with following example. In this example embodiment, the geodesic distances are calculated for each background seed of the BS1. In an example, a geodesic distance of a background seed (for example, x, where x is a subset of BS1) is defined as a least integral of the geodesic weight over paths from the first set of foreground seeds FS1 to the background seed x. The geodesic distance for the background seed x from the foreground seeds FS1 is calculated as per the following equation (1):

$$D_F(x)|_{x \in BS1} = \min_{s \in FS1} d(s, x) \quad (1)$$

where $D_F(x)$ is the geodesic distance for the seed x, and x is a subset of the first set of background seeds BS1, s is a seed belonging to the first set of foreground seeds FS1, and d(s, x) is a geodesic distance between seed s and the seed x. In an example embodiment, the d(s, x) may be determined as per the following equation (2):

$$d(s, x) = \min_{L_{s,x}} \int_0^1 |W(L_{s,x}(p) \cdot L_{s,x}(p)| dp \quad (2)$$

where d(s, x) is the geodesic distance between seeds s and x, $L_{s,x}(p)$ represents a path parameterized by p=[0, 1] and which connects the seed s and the seed x, and W ($L_{s,x}(p)$) is the geodesic weight associated with the seeds s and x, and represents appearance metric between the seeds s and x. In an example embodiment, the appearance metric W ($L_{s,x}(p)$) may be determined by the following equation (3):

$$W_{(s,x)} = \frac{1}{2} \sum_{k=1}^{k} \frac{[h_s(k) - h_x(k)]^2}{h_s(k) + h_x(k)} \quad (3)$$

where, the $x^2$ distance is computed between the features of each pair of consecutive segments along the path, that is CIE Lab color histograms $h_s(k)$ and $h_x(k)$. In the above equation (3), K is a total number of bins present in a descriptor (for example, 20 for each CIE lab channel). In an example embodiment, once the geodesic distances for the seeds of the BS1 is obtained, the seeds of the BS1 are ranked in the order of corresponding geodesic distances, and top first threshold percentage of the seeds (depending upon the ranking) are selected as the BS2.

In an example embodiment, the apparatus 200 is caused to add one or more superpixels of a first set of unclassified superpixels (USP1) to the second set of background seeds BS2 to generate a third set of background seeds (BS3). In this example embodiment, the one or more superpixels of the first set of unclassified superpixels USP1 are added based on the geodesic distances of superpixels of the first set of unclassified superpixels USP1 from the first set of foreground seeds FS1 and from the second set of background seeds BS2. In this example embodiment, the first set of unclassified superpixels USP1 includes superpixels of the plurality of superpixels other than the first set of foreground seeds FS1 and the second set of background seeds BS2. In this example, the geodesic distances of the superpixels of the first set of unclassified superpixels USP1 from the first set of foreground seeds FS1 are calculated by replacing the seed s and the seed x in equation (2) with seeds of FS1 and superpixels of USP1, respectively. Further, in this example, the geodesic distances of the superpixels of the first set of unclassified superpixels USP1 from the second set of background seeds BS1 are calculated by replacing the seed s and the seed x in equation (2) with the seeds of BS1 and the superpixels of USP1, respectively. For example, geodesic distance between a superpixel x of USP1 and the seeds of FS1 (represented by $D_{FS1}(x)$) may be calculated, and geodesic distance between the superpixel x of USP1 and seeds of BS2 (represented by $D_{BS2}(x)$) may be calculated. In an example embodiment, a processing means may be configured to generate the third set of background seeds BS3. An example of the processing means may include the processor 202, which may be an example of the controller 108.

In an example embodiment of adding the one or more superpixels to the second set of background superpixels BS2 to generate the third set of background superpixels BS3, the apparatus 200 is caused to calculate geodesic distances of superpixels of the first set of unclassified superpixels USP1 from one or more seeds of the first set of foreground seeds FS1 and from one or more seeds of the second set of background seeds BS2. In an example embodiment, a processing means may be configured to calculate geodesic distances of the superpixels of the first set of unclassified superpixels USP1 from one or more seeds of the first set of foreground seeds FS1 and from one or more seeds of the second set of background seeds BS2. An example of the processing means may include the processor 202, which may be an example of the controller 108. In this example embodiment, the apparatus 200 is caused to determine relative geodesic distances of the superpixels of the first set of unclassified superpixels USP1 from the first set of foreground seeds FS1 and the second set of background seeds BS2 based on the geodesic distances of the superpixels of the first set of unclassified superpixels USP1 from the one or more seeds of the first set of foreground seeds FS1 and from the one or more seeds of the second set of background seeds BS2. In this example, a relative geodesic distance for an unclassified superpixel x of USP1 from FS1 is calculated as per the equation (4) as given below:

$$G_{FS1}(X) = \frac{D_{FS1}(X)}{D_{FS1}(X) + D_{BS2}(X)} \quad (4)$$

where $G_{FS1}(x)$ represents the relative geodesic distance of an unclassified superpixel x in the first set of unclassified superpixels USP1 from FS1, $D_{FS1}(x)$ represents geodesic distance of the unclassified superpixel x from the first set of foreground seeds FS1, and $D_{BS2}(x)$ represents geodesic distance of the unclassified superpixel x from the second set of background seeds BS2. In an example embodiment, a processing means may be configured to determine relative geodesic distances of the superpixels of the first set of unclassified superpixels USP1 from the one or more seeds of the first set of foreground seeds FS1 and from the one or more seeds of the second set of background seeds BS2. An example of the processing means may include the processor 202, which may be an example of the controller 108.

In this example embodiment of adding the one or more superpixels to the second set of background superpixels BS2 to generate the third set of background superpixels BS3, the apparatus 200 is caused to rank the superpixels of the first set of unclassified superpixels USP1 based on the relative geodesic distances of the superpixels of the first set of unclassified superpixels USP1. In an example, suitable techniques, including but not limited to, a ranking algorithm can be used to rank the superpixels of the first set of unclassified superpixels USP1 based on the relative geodesic distances of the superpixels of the first set of unclassified superpixels USP1. In this example, the superpixels of the first set of unclassified superpixels USP1 are ranked based on a descending order of relative geodesic distances. In an example embodiment, a processing means may be configured to rank the superpixels of the first set of unclassified superpixels USP1 based on the relative geodesic distances of the superpixels of the first set of unclassified superpixels USP1. An example of the processing means may include the processor 202, which may be an example of the controller 108.

In an example embodiment of adding the one or more superpixels to the second set of background superpixels BS2 to generate the third set of background superpixels BS3, the apparatus 200 is caused to determine the one or more superpixels (that are added to the BS2) based on a second threshold percentage of the superpixels of the first set of unclassified superpixels USP1. In an example embodiment, a processing means may be configured to determine the one or more superpixels based on the second threshold percentage of the superpixels of the first set of unclassified superpixels USP1. An example of the processing means may include the processor 202, which may be an example of the controller 108. In an example, the second threshold percentage may be a pre-determined value. In this example, top-ranked seeds of the second set of background seeds BS2 ranked above the second threshold percentage are determined to be the superpixels to be added to the second set of background seeds BS2 to generate the third set of background seeds BS3.

In an example embodiment, the apparatus 200 is caused to add one or more superpixels of a second set of unclassified superpixels (USP2) to the third set of background seeds BS3 to generate a fourth set of background seeds (BS4) based on applying a classifier on the second set of unclassified superpixels USP2. In an example embodiment, the second set of unclassified superpixels USP2 includes superpixels of the plurality of superpixels of the input image that are other than the first set of foreground seeds FS1 and the third set of background seeds BS3. In an example embodiment, a processing means may be configured to generate the fourth set of background seeds BS4. An example of the processing means may include the processor 202, which may be an example of the controller 108.

In an example embodiment of adding the one or more superpixels of the second set of unclassified superpixels USP2 to the third set of background seeds BS3 to generate the fourth set of background seeds BS4, the apparatus 200 is caused to train the classifier based on the first set of foreground seeds FS1 and the third set of background seeds BS3. In an example embodiment, a processing means may be configured to train the classifier based on the first set of foreground seeds FS1 and the third set of background seeds BS3. An example of the processing means may include the processor 202, which may be an example of the controller 108. In this example embodiment of adding the one or more superpixels of the USP2 to the BS3 to generate the BS4, the apparatus 200 is caused to apply the classifier on the USP2 of the input image to determine the one or more superpixels of the USP2. In an example embodiment, a processing means may be configured to apply the classifier on the second set of unclassified superpixels USP2 of the input image to determine the one or more superpixels of the second set of unclassified superpixels USP2. An example of the processing means may include the processor 202, which may be an example of the controller 108.

In this example embodiment of adding the one or more superpixels of the USP2 to the BS3 to generate the BS4, the apparatus 200 is caused to mix the one or more superpixels of the second set of unclassified superpixels USP2 to the third set of background seeds BS3 to generate the fourth set of background seeds BS4. In an example, the classifier may be a linear support vector machine (SVM) classifier, a random forest classifier, or an Adaboosting classifier used for image segment classification. In an example embodiment, a processing means may be configured to mix the one or more superpixels of the second set of unclassified superpixels USP2 to the third set of background seeds BS3 to generate the fourth set of background seeds BS4. An example of the processing means may include the processor 202, which may be an example of the controller 108.

In an example embodiment, the fourth set of background seeds BS4 represents the background seeds in the input image. In an example embodiment, the fourth set of background seeds BS4 may be segmented as a background of the input image. In this example embodiment, the background of the input image is hence segmented from foreground of the input image. In an example embodiment, the foreground of the input image may also be segmented by updating the first set of foreground seeds FS1 based on applying the classifier to generate a second set of foreground seeds (FS2). In this example embodiment, the apparatus 200 is caused to train the classifier based on the first set of foreground seeds FS1 and the third set of background seeds BS3. In an example embodiment, a processing means may be configured to train the classifier based on the first set of foreground seeds FS1 and the third set of background seeds BS3. An example of the processing means may include the processor 202, which may be an example of the controller 108. In this example embodiment of adding one or more superpixels of the second set of unclassified superpixels USP2 to the first set of foreground seeds FS1 to generate the second set of foreground seeds FS2, the apparatus 200 is caused to apply the classifier on the second set of unclassified superpixels USP2 of the input image to determine the one or more superpixels of the USP2 that may be added as foreground seeds to the FS1 to generate the FS2.

Figure 3:
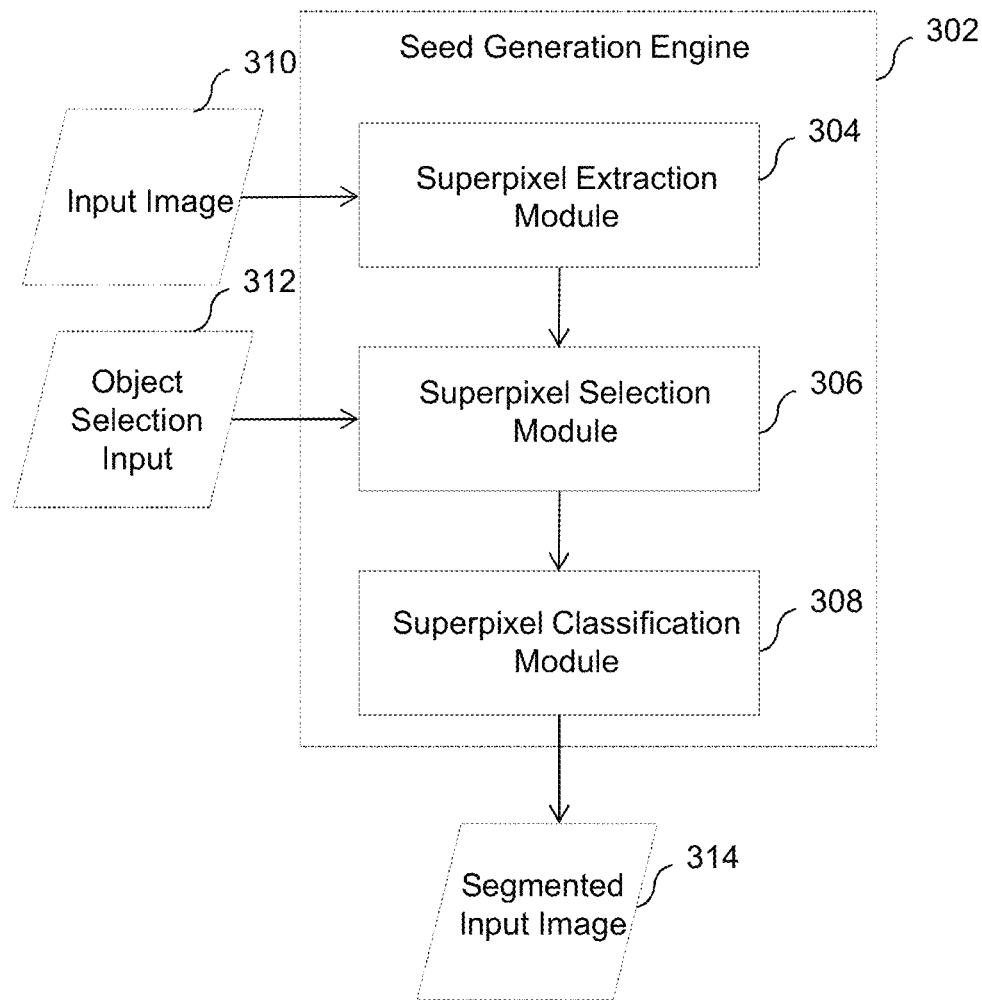
FIG. 3 illustrates a seed generation engine for seed generation, in accordance with an example embodiment.

FIG. 3 illustrates a seed generation engine 302 for seed generation, in accordance with an example embodiment. The seed generation engine 302 may be embodied, for example, in the processor 202 or otherwise accessible to the processor 202 of the apparatus 200 of FIG. 2. The seed generation engine 302 is configured to cause the apparatus 200 to segment the input image by generating background seeds and/or foreground seeds based on the object selection input. For instance, the seed generation engine 302 causes the apparatus 200 to generate the fourth set of background seeds BS4 and/or the second set of foreground seeds FS2.

The seed generation engine 302 includes or otherwise is in communication with a superpixel extraction module 304, a superpixel selection module 306 and a superpixel classification module 308. The superpixel extraction module 304 receives an input image (shown by 310) and segments the input image 310 into the plurality of superpixels. The input image 310 includes a plurality of pixels. The pixels are further grouped into segments or superpixels based on different parameters, for example color, intensity, and texture. The superpixels are spatially extended entities as compared to a rigid structure of a pixel grid and improve image segmentation as complexity of image processing tasks is reduced. In this example embodiment, a superpixel extraction method such as a fast graph-based segmentation method can be applied to segment the input image 310 into the plurality of superpixels.

The superpixel selection module 306 receives the plurality of superpixels of the input image 310 and the object selection input (shown by 312) from the user. The superpixel selection module 306 is configured to receive the object selection input 312, for example, by allowing the user to scribble onto the input image displayed on a display screen, or by provisioning the user to select at least a part of the foreground object in the input image 310. An example of the object selection input 312 may include scribbles made by the user using a finger or a stylus. In this example embodiment, the superpixel selection module 306 determines the first set of superpixels of the plurality of superpixels as the first set of foreground seeds FS1 based on the object selection input 312. Herein, the 'first set of superpixels' refers to superpixels of the plurality of superpixels that intersect with the object selection input 312 (the scribbles). In this example embodiment, the superpixel selection module 306 determines the second set of superpixels of the plurality of superpixels of the input image 310 as the first set of background seeds BS1. The second set of superpixels is included within a pre-determined region of the input image 310. Herein, the 'second set of superpixels' refers to superpixels of the plurality of superpixels that are present within the pre-determined region (for example, image regions in proximity with a border of the input image) of the input image 310.

The superpixel classification module 308 enables generation of seeds in one or more steps. The first set of background seeds BS1 are first filtered by the superpixel classification module 308 to generate the second set of background seeds BS2 based on geodesic distances between seeds of the first set of foreground seeds FS1 and seeds of the first set of background seeds BS1. The first set of foreground seeds FS1 are classified (or labeled) as positive seeds, and the first set of background seeds BS1 are classified (or labeled) as negative seeds. In an example embodiment, as the user provides the object selection input 312, the first set of foreground seeds FS1 (that are obtained based on the object selection input 312) are assumed to be classified (or labeled) correctly as foreground seeds, however the first set of background seeds BS1 can include noisy superpixels that may belong to the foreground of the input image 310. The noisy superpixels are further removed or filtered from the first set of background seeds BS1 to generate the second set of background seeds BS2. In this example embodiment, the noisy superpixels are determined as the superpixels of the first set of background seeds BS1 that have a higher likelihood of being associated with the foreground object (for example, having minimal geodesic distances from the first set of foreground seeds FS1). The geodesic distances are calculated for each seed in the first set of background seeds BS1 from the first set of foreground seeds FS1. The seeds of the first set of background seeds BS1 are then ranked based on a decreasing order of the geodesic distances of the seeds of the first set of background seeds BS1. A first threshold percentage of top-ranked seeds of the first set of background seeds BS1 are determined as the second set of background seeds BS2 and the remaining seeds of the first set of background seeds BS1 are filtered out as the noisy superpixels.

Secondly, the superpixel classification module 308 generates background seeds in two steps. In a first step, the third set of background seeds BS3 are generated by adding one or more superpixels of the first set of unclassified superpixels USP1 to the second set of background seeds BS2. Herein, the 'first set of unclassified superpixels USP1' refers to the superpixels of the plurality of superpixels other than the first set of foreground seeds FS1 and the second set of background seeds BS2. The one or more superpixels of the first set of unclassified superpixels USP1 are determined based on calculating the geodesic distances of the superpixels of the first set of unclassified superpixels USP1 from the first set of foreground seeds FS1 and the second set of background seeds BS2. For an unclassified superpixel, the relative geodesic distance from the first set of foreground seeds FS1 is determined based on the geodesic distances of the superpixels of the first set of unclassified superpixels USP1 from the one or more seeds of the first set of foreground seeds FS1 and from the one or more seeds of the second set of background seeds BS2. The relative geodesic distance is calculated for each unclassified superpixel in the first set of unclassified superpixels USP1. The superpixels of the first set of unclassified superpixels USP1 are then ranked based on the relative geodesic distances of the superpixels of the first set of unclassified superpixels USP1. The one or more superpixels of the first set of unclassified superpixels USP1 are then determined based on a second threshold percentage. The second threshold percentage of the superpixels of the first set of unclassified superpixels USP1 are determined as the one or more superpixels and are added to the second set of background seeds BS2 to generate the third set of background seeds BS3.

In a second step, the superpixel classification module 308 generates the fourth set of background seeds BS4 by adding one or more superpixels of a second set of unclassified superpixels USP2 of the input image 310 to the third set of background seeds BS3 based on applying the classifier on the second set of unclassified superpixels USP2. Herein, the 'second set of unclassified superpixels USP2' refers to the superpixels of the plurality of superpixels other than the first set of foreground seeds FS1 and the third set of background seeds BS3. Examples of the classifier used include, but are not limited to, support vector machine (SVM), random forest, and Adaboosting. In this example embodiment, the pixels of the input image 310 are converted from one color space to another, for example from an RGB color space to a CIE Lab color space and color histograms corresponding to the CIE Lab color space are formed. The classifier, for example a linear SVM, is trained on the first set of foreground seeds FS1 and the third set of background seeds BS3 that are the labeled or classified superpixels in the input image 310. The classifier is then applied on the second set of unclassified or unlabelled superpixels USP2 of the input image 310 to determine the one or more superpixels of the second set of unclassified superpixels USP2. The one or more superpixels of the second set of unclassified superpixels USP2 are then mixed to the third set of background seeds BS3 to generate the fourth set of background seeds BS4. The fourth set of background seeds BS4 further form the background of the input image 310.

A second set of foreground seeds FS2 can further be generated by training the classifier based on the first set of foreground seeds FS1 and the third set of background seeds BS3, by applying the classifier on the second set of unclassified superpixels USP2 of the input image 310 to determine the one or more superpixels of the second set of unclassified superpixels USP2, and by adding the one or more superpixels of the second set of unclassified superpixels USP2 to the first set of foreground seeds FS1 to generate the second set of foreground seeds FS2. The second set of foreground seeds FS2 further form the foreground of the input image 310. A segmented input image 314 is then generated by the superpixel classification module 308.

In an example embodiment, the seed generation engine 302 is caused to perform the seed generation. In an example embodiment, a processing means may be configured to perform the seed generation. An example of the processing means may include the processor 202, which may be an example of the controller 108. In this example embodiment, the processor 202 is configured to, with the content of the memory 204, and optionally with other components described in FIG. 2, to cause the seed generation engine 302 to perform the seed generation.

Figure 4A:
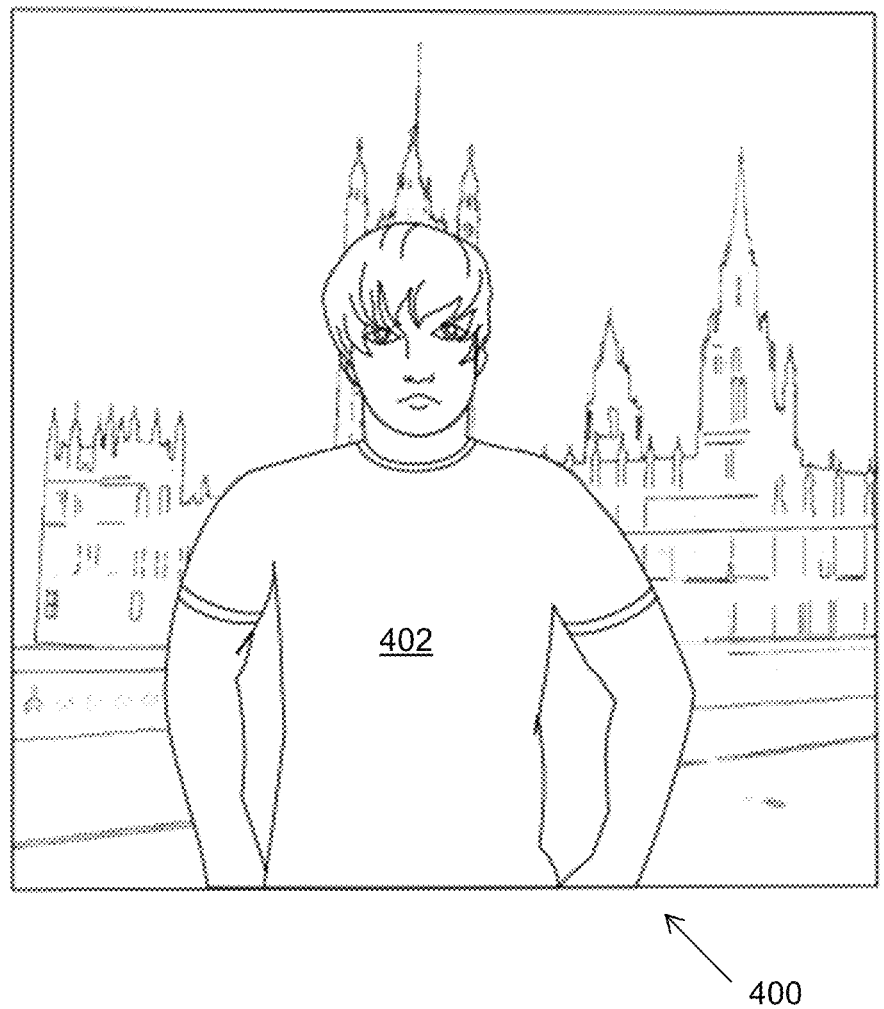
FIGS. 4A to 4G are example illustrations of seed generation for image segmentation, in accordance with an example embodiment.

FIGS. 4A-4F are example illustrations of seed generation for image segmentation, in accordance with an example embodiment. FIG. 4A represents an input image 400 in an example scenario, in accordance with an example embodiment. The input image 400 is captured by an image sensor (for example, the image sensor 208). As shown, the input image 400 includes a foreground and a background. The foreground includes a foreground object (a man 402) in the input image 400 and the background includes a background object (a building) in the input image 400. Image segmentation is performed on the input image 400 in order to determine the foreground and the background of the input image 400.

Figure 4B:
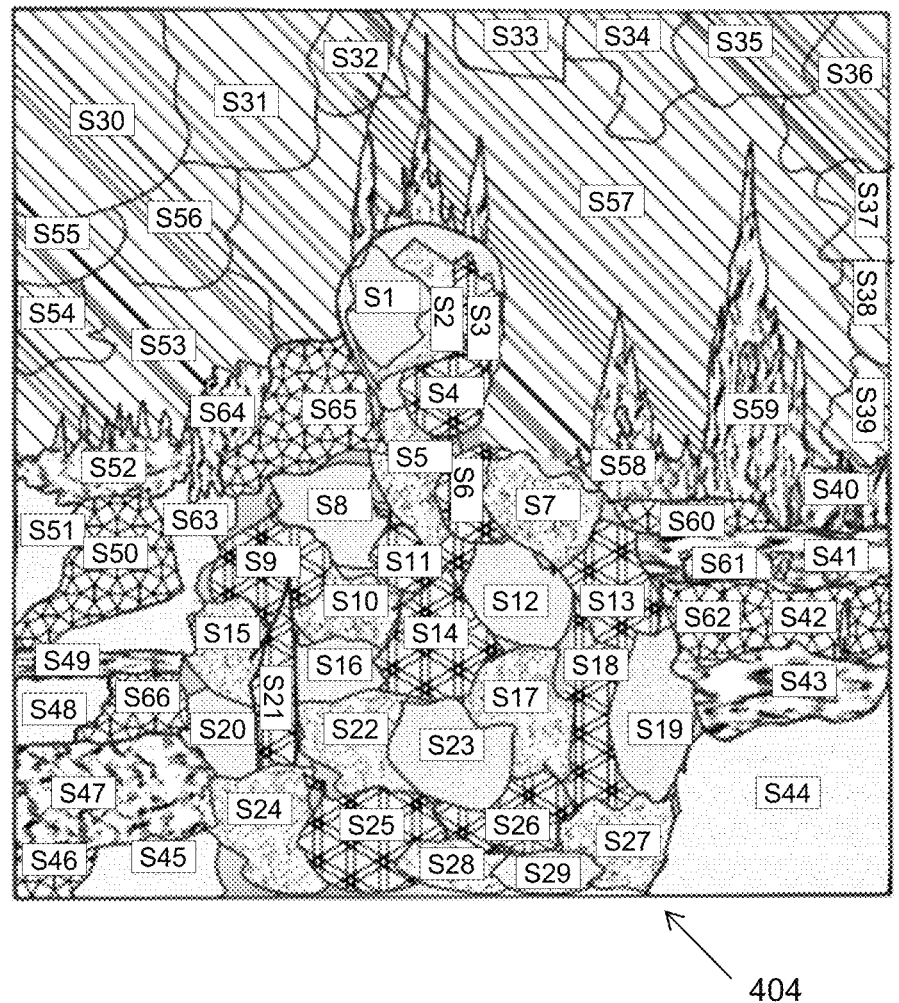

FIG. 4B represents an example representation 404 of the input image 400, in accordance with an example embodiment. As shown, the representation 404 of the input image 400 depicts segmentation of the input image 400 into a plurality of superpixels, for example superpixels S1 to S66. The foreground object (the man 402) is represented by the superpixels, S1 to S29 and one or more background objects are represented by the superpixels S30 to S66. The segmentation of the input image (for example, the input image 400) into the plurality of superpixels (for example, S1-S66) is described with reference to FIG. 2. In another example, the input image 400 may be segmented into the superpixels S1 to S66 (as shown in the representation 404) by the superpixel extraction module 304 as described with reference to FIG. 3.

Figure 4C:
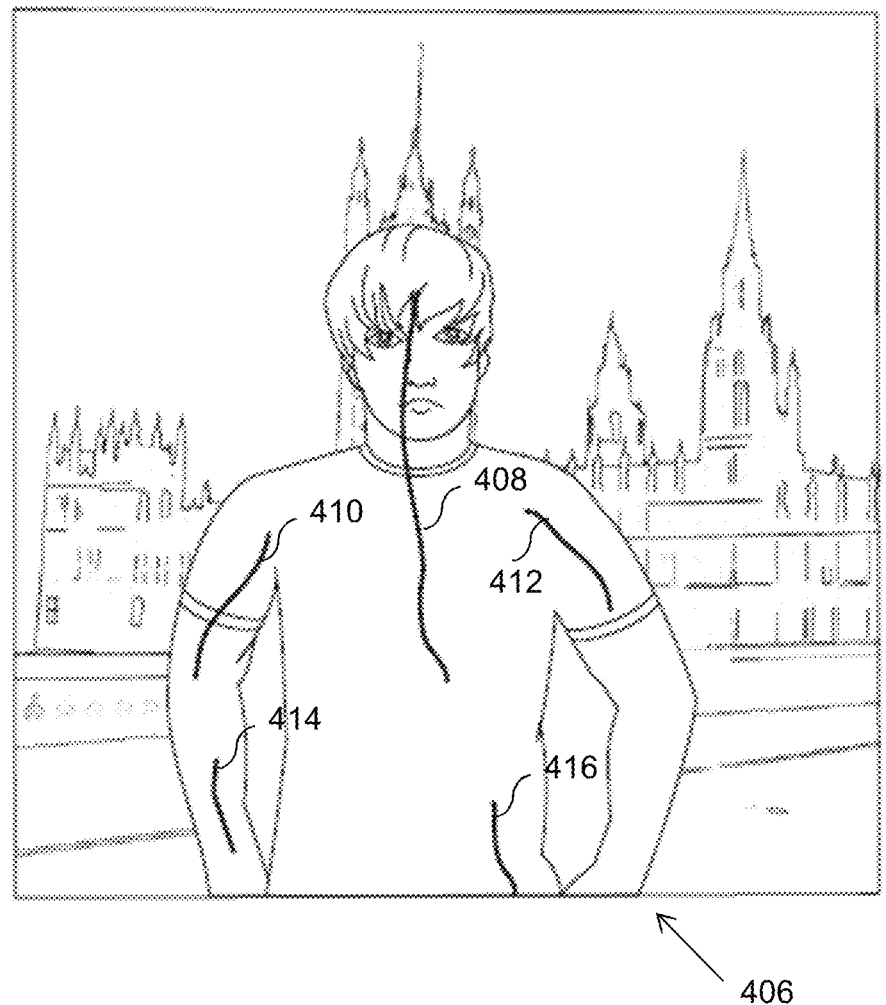

FIG. 4C represents an example representation 406 of the input image 400, in accordance with an example embodiment. The representation 406 depicts an object selection input provided for the selection of at least a part of the foreground object (the man 402). The object selection input includes scribbles 408, 410, 412, 414 and 416 that is provided by the user using a finger input or a stylus, or using any other gesture. The object selection input is provided by the user in order to select at least a part (for example, face, hand, stomach) of the foreground object (the man 402) of the input image 400.

Figure 4D:
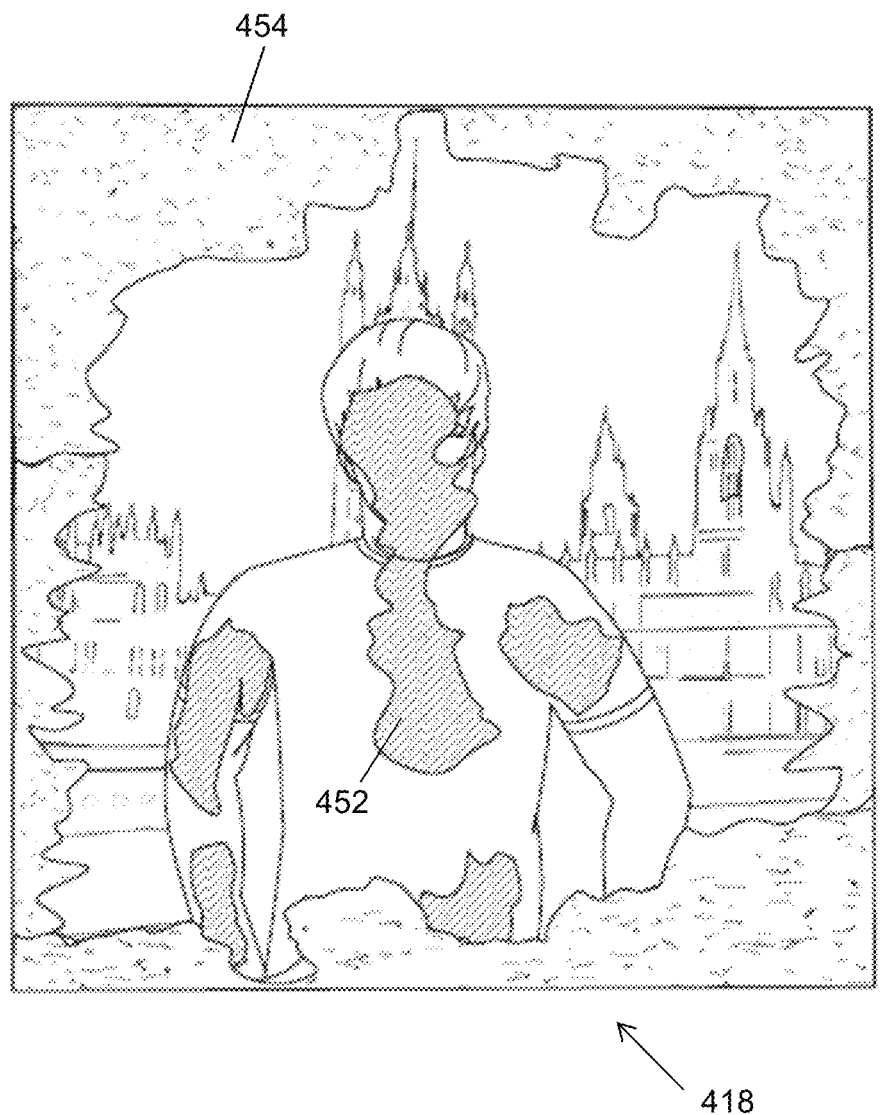

FIG. 4D represents an example representation 418 of the input image 400, in accordance with an example embodiment. The representation 418 depicts a first set of foreground seeds FS1 (shown by 452) and a first set of background seeds BS1 (shown by 454). A first set of superpixels (S1, S2, S4, S5, S6, S11, S14, S9, S15, S7, S13, S24, S26 and S29) of the plurality of superpixels S1 to S66 that intersect with the object selection input (the scribbles 408, 410, 412, 414 and 416) are determined as the first set of foreground seeds FS1. For example, the superpixels S1, S2, S4, S5, S6, S11 and S14 intersects with the scribble 408, the superpixels S9 and S15 intersects with the scribble 410, the superpixels S7 and S13 intersects with the scribble 412, the superpixel S24 intersects with the scribble 414, and the superpixel S26 intersects with the scribble 416. A second set of superpixels (S30 to S44, S25, S28, S29, S45 to S51, S54 and S55) of the plurality of superpixels (S1 to S66) that are included within a pre-determined region (proximity with the image border) of the input image 418 is determined as the first set of background seeds BS1. The first set of foreground seeds FS1 and the first set of background seeds BS1 are determined as described with reference to FIG. 2, and/or by the superpixel selection module 306 as described with reference to FIG. 3.

Figure 4E:

FIG. 4E represents an example representation 420 of the input image 400, in accordance with an example embodiment. The representation 420 depicts the first set of foreground seeds FS1 (shown by 452) and a second set of background seeds BS2 (shown by 456). The second set of background seeds BS2 is a subset of the first set of background seeds BS1 and is generated by filtering the first set of background seeds BS1 based on geodesic distances between the first set of foreground seeds FS1 and the first set of background seeds BS1. The first set of background seeds BS1 can include noisy superpixels, for example superpixels S25, S28 and S29 that belong to the foreground of the input image 420. The noisy superpixels S25, S28 and S29 are filtered from the first set of background seeds BS1 (S30 to S44, S25, S28, S29, S45 to S51, S54 and S55) to generate the second set of background seeds BS2 (S30 to S44, S45 to S51, S54 and S55). The geodesic distances are calculated for each seed in the first set of background seeds BS1 from the first set of foreground seeds FS1 (S1, S2, S4, S5, S6, S11, S14, S9, S15, S7, S13, S24, S26 and S29). For example, for the seed S30, the geodesic distance is calculated between the seed S30 and each seed of the first set of foreground seeds FS1 (S1, S2, S4, S5, S6, S11, S14, S9, S15, S7, S13, S24, S26 and S29) and a least geodesic distance is taken as the geodesic distance for the seed S30 (for example, geodesic distance between the seed S30 and the seed S1). An example embodiment of calculation of the geodesic distances between two seeds is described with reference to FIG. 2. Similarly, the geodesic distances are calculated for each seed in the first set of background seeds BS1. The seeds of the first set of background seeds BS1 are then ranked based on a decreasing order of the geodesic distances of the seeds of the first set of background seeds BS1. The top-ranked seeds having ranking above a first threshold percentage (for example, top 70 percent), of the first set of background seeds BS1 are determined as the second set of background seeds BS2 (S30 to S44, S45 to S51, S54 and S55) and the remaining seeds (S25, S28 and S29) of the first set of background seeds BS1 (for example, bottom 30 percent) are filtered out as the noisy superpixels.

Figure 4F:
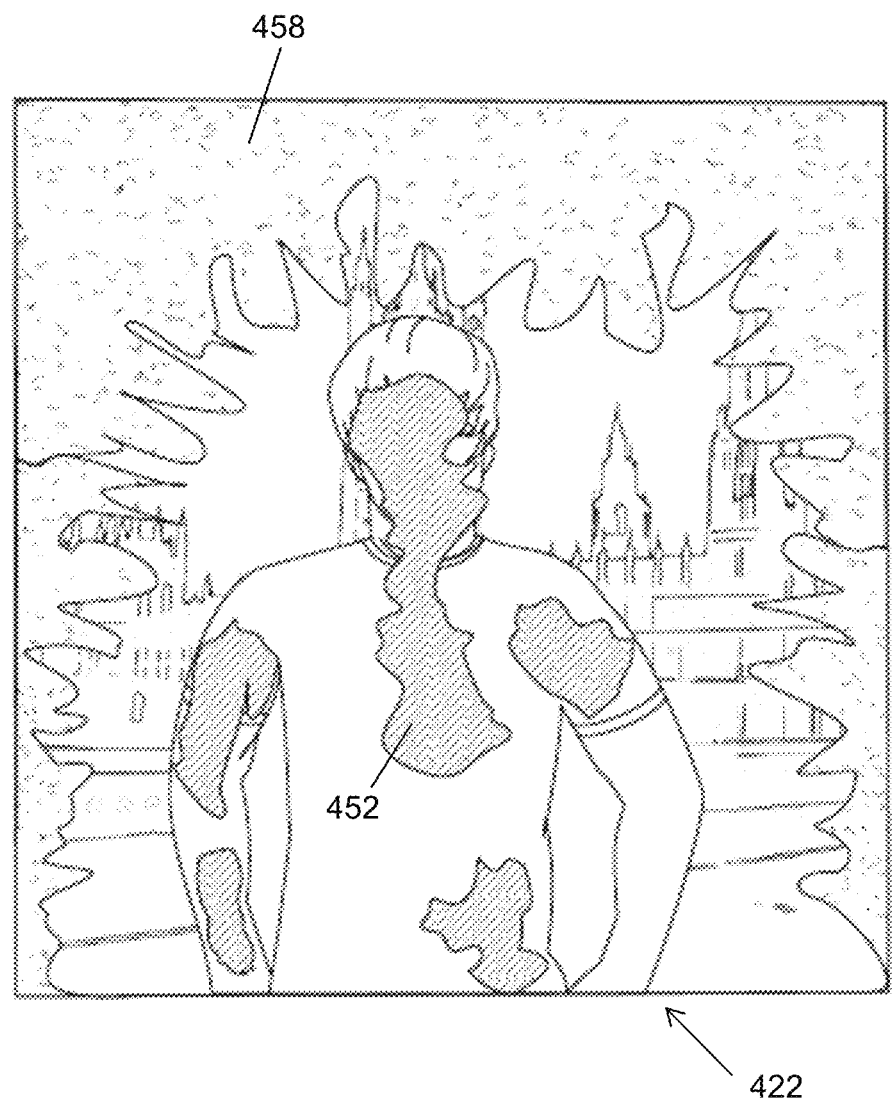

FIG. 4F represents an example representation 422 of the input image 400, in accordance with an example embodiment. The representation 422 depicts the first set of foreground seeds FS1 (shown by 452) and a third set of background seeds BS3 (shown by 458). The third set of background seeds BS3 (S30 to S56, S63 and S64) is an expansion of the second set of background seeds BS2 (S30 to S44, S45 to S51, S54 and S55). The third set of background seeds BS3 is generated by adding one or more superpixels (S63, S52, S53, S56 and S64) of the first set of unclassified superpixels USP1 (S3, S7, S8, S10, S12, S16 to S23, S25, S27, S28, S63, S52, S53, S56, S64, S66, S65, S57, S58, S59, S60, S61, S62 and S66) to the second set of background seeds BS2 (S30 to S44, S45 to S51, S54 and S55). The one or more superpixels of the first set of unclassified superpixels USP1 are determined based on calculating the geodesic distances of the superpixels of the first set of unclassified superpixels USP1 from the first set of foreground seeds FS1 and the second set of background seeds BS2. For an unclassified superpixel, say S63, the relative geodesic distance from the first set of foreground seeds FS1 is determined based on the geodesic distances of the superpixels of the first set of unclassified superpixels USP1 from the one or more seeds of the first set of foreground seeds FS1 and from the one or more seeds of the second set of background seeds BS2. The relative geodesic distance is thus calculated for each unclassified superpixel in the first set of unclassified superpixels USP1. The superpixels of the first set of unclassified superpixels USP1 are then ranked based on the relative geodesic distances of the superpixels of the first set of unclassified superpixels USP1. The one or more superpixels of the first set of unclassified superpixels USP1 are then determined based on the second threshold percentage, for example 70%, of the superpixels of the first set of unclassified superpixels USP1. The one or more superpixels are subsequently added to the second set of background seeds BS2 to generate the third set of background seeds BS3.

Figure 4G:
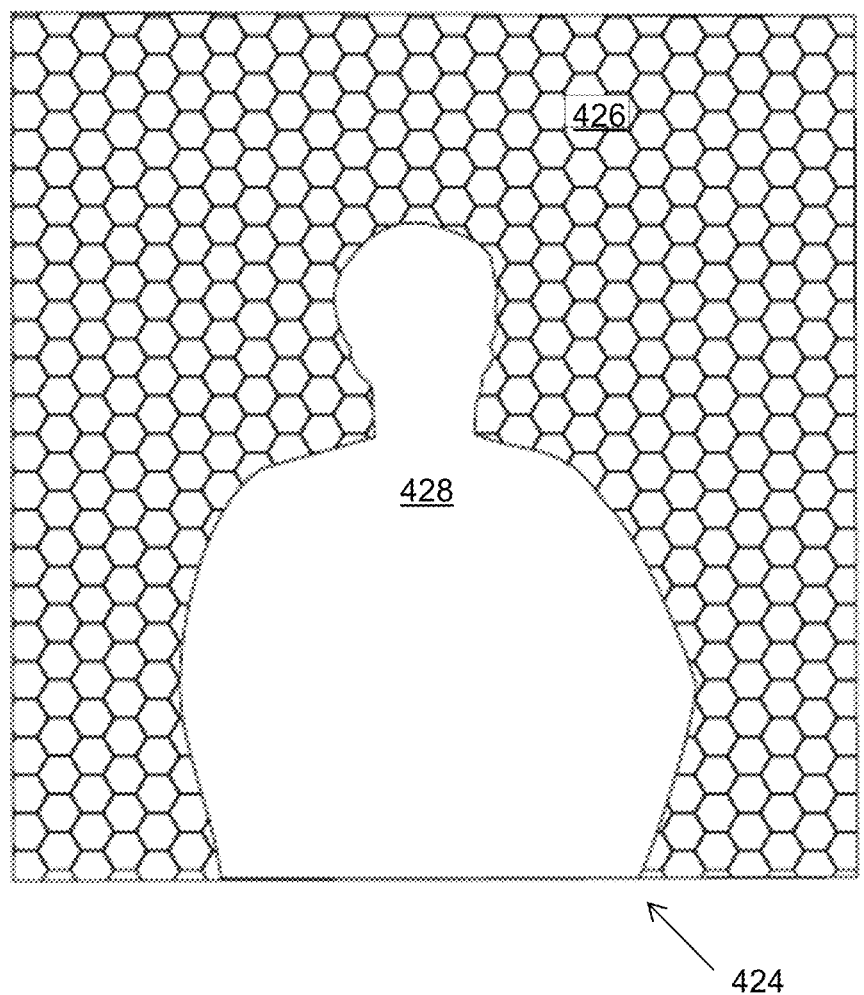

FIG. 4G represents an example representation 424 of the input image 400, in accordance with an example embodiment. The representation 424 depicts the foreground and the background of the input image 400 after the image segmentation is performed in the above steps using seed generation. The fourth set of background seeds BS4 (S30 to S66) is an extension of the third set of background seeds BS3 (S30 to S56, S63 and S64). The fourth set of background seeds BS4 is generated by adding one or more superpixels (S66, S65, S57, S58, S59, S60, S61 and S62) of the second set of unclassified superpixels USP2 (S3, S7, S8, S10, S12, S16 to S23, S25, S27, S28, S66, S65, S57, S58, S59, S60, S61 and S62) to the third set of background seeds BS3 (S30 to S56, S63 and S64). The one or more superpixels (S66, S65, S57, S58, S59, S60, S61 and S62) of the second set of unclassified superpixels USP2 are determined based on using the classifier on the second set of unclassified superpixels USP2 (S66, S65, S57, S58, S59, S60, S61, S62 and S66). The classifier, for example a linear SVM, is trained based on the first set of foreground seeds FS1 and the third set of background seeds BS3 that are the classified superpixels in the input image. The classifier is then applied on the second set of unclassified superpixels USP2 to determine the one or more superpixels of the second set of unclassified superpixels USP2. The one or more superpixels (S66, S65, S57, S58, S59, S60, S61 and S62) of the second set of unclassified superpixels USP2 are then mixed to the third set of background seeds BS3 (S30 to S56, S63 and S64) to generate the fourth set of background seeds BS4 (S30 to S66). The fourth set of background seeds BS4 (S30 to S66) now form a segmented background 426.

In an example embodiment, the second set of foreground seeds FS2 (S1 to S29) can be generated by training the classifier based on the first set of foreground seeds FS1 (S1, S2, S4, S5, S6, S11, S14, S9, S15, S7, S13, S24, S26 and S29) and the third set of background seeds BS3 (S30 to S56, S63 and S64) that are the classified superpixels in the input image 400. The classifier is then applied on the second set of unclassified superpixels USP2 (S3, S7, S8, S10, S12, S16 to S23, S25, S27, S28, S66, S65, S57, S58, S59, S60, S61 and S62) to determine the one or more superpixels (S3, S7, S8, S10, S12, S16 to S23, S25, S27 and S28) of the second set of unclassified superpixels USP2. The one or more superpixels of the second set of unclassified superpixels USP2 are then added to the first set of foreground seeds FS1 to generate the second set of foreground seeds FS2. The second set of foreground seeds FS2 (S1 to S29) now form a segmented foreground 428. In some example embodiments, some other techniques of image segmentation known in the art can be used to generate the segmented background 426 and the segmented foreground 428.

The second set of background seeds BS2, the third set of background seeds BS3, the fourth set of background seeds BS4, and the second set of foreground seeds FS2 are determined by the superpixel classification module 308 as described with reference to FIG. 3.

Figure 5:
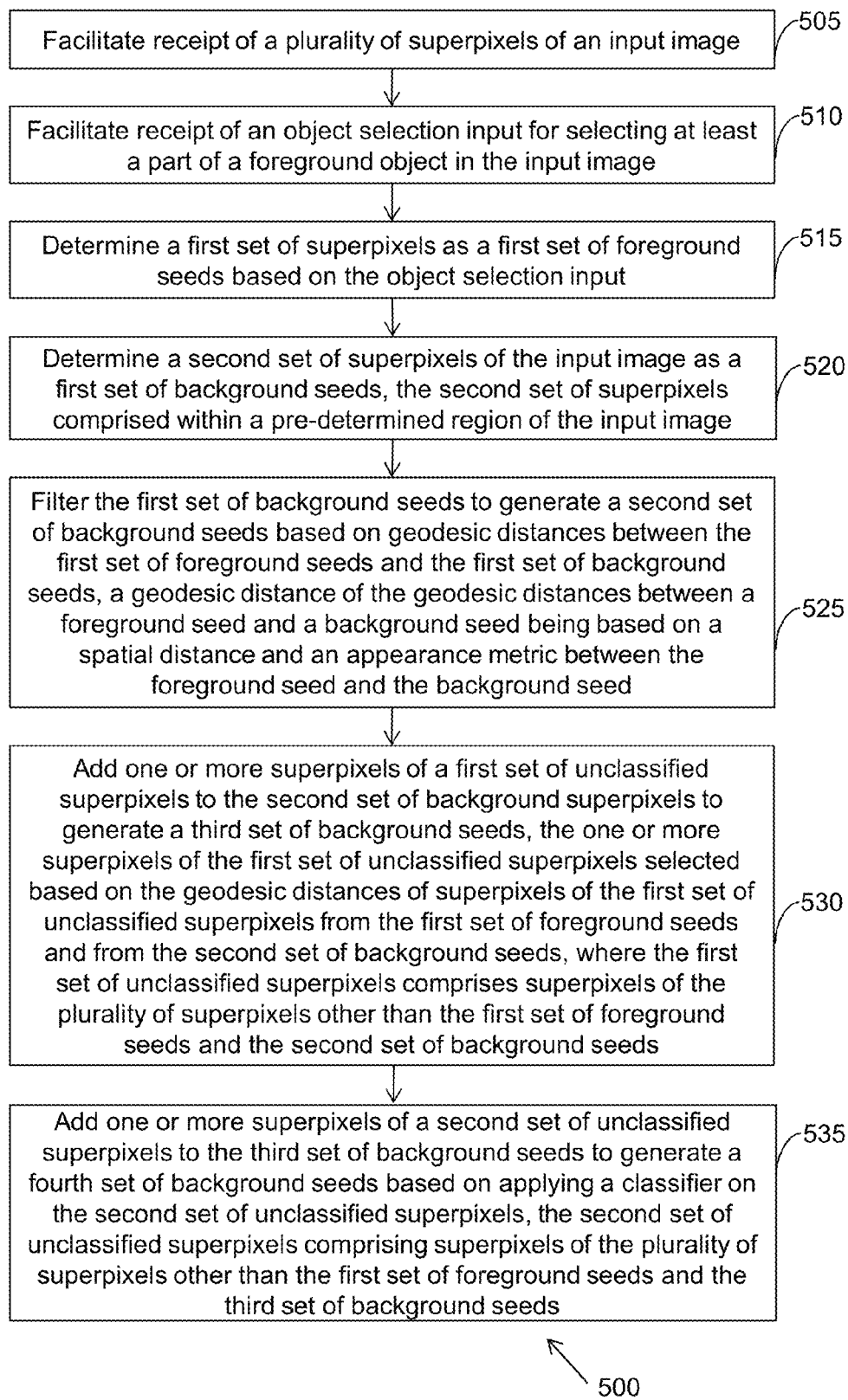
FIG. 5 is a flowchart depicting an example method for image segmentation, in accordance with an example embodiment.

FIG. 5 is a flowchart depicting an example method 500 for image segmentation, in accordance with an example embodiment. The method 500 is shown and explained with reference to FIG. 2. The method 500 depicted in the flowchart may be executed by, for example, the apparatus 200 of FIG. 2.

At 505, the method 500 includes facilitating receipt of a plurality of superpixels of an input image I. In an example embodiment, the input image I is segmented into the plurality of superpixels using a segmentation method. The segmentation of the input image I is performed by a superpixel extraction module 304 as described in FIG. 3. The input image I is captured by an image sensor, for example the image sensor 208.

At 510, the method 500 includes facilitating receipt of an object selection input for selecting at least a part of a foreground object in the input image. In an example embodiment, the object selection input is provided by a user by using a finger input or a stylus, or any other gesture. In an example, the object selection input includes one or more scribbles on the foreground object in the input image I.

At 515, the method 500 includes determining a first set of superpixels of the plurality of superpixels as a first set of foreground seeds FS1 based on the object selection input. In an example embodiment, the first set of superpixels are superpixels that intersect with the object selection input in the input image I and is determined as the first set of foreground seeds FS1. The first set of foreground seeds FS1 are determined by a superpixel selection module 306 as described with reference to FIG. 3.

At 520, the method 500 includes determining a second set of superpixels of the plurality of superpixels as a first set of background seeds BS1. The second set of superpixels is included within a pre-determined region of the input image I. In an example embodiment, the second set of superpixels is the superpixels that are included within the pre-determined region, for example image regions in proximity with a border of the input image I. The first set of background seeds BS1 are determined by the superpixel selection module 306 as described with reference to FIG. 3.

At 525, the method 500 includes filtering the first set of background seeds BS1 to generate a second set of background seeds BS2 based on geodesic distances between the first set of foreground seeds FS1 and the first set of background seeds BS1. A geodesic distance, associated with a geodesic weight of the geodesic distances between a foreground seed and a background seed is based on a spatial distance and an appearance metric between the foreground seed and the background seed. Herein, the 'appearance metric' refers to distance between two seeds as perceived by human eye. The second set of background seeds BS2 are determined by the superpixel classification module 308 as described with reference to FIG. 3.

In this example embodiment, the first set of background seeds BS1 are filtered by calculating geodesic distances of seeds of the first set of background seeds BS1 from one or more seeds of the first set of foreground seeds FS1, by ranking the seeds of the first set of background seeds BS1 based on the geodesic distances of the seeds of the first set of background seeds BS1, and by determining a first threshold percentage of the first set of background seeds BS1 as the second set of background seeds BS2 based on the ranking of the seeds of the first set of background seeds BS1.

At 530, the method 500 includes adding one or more superpixels of a first set of unclassified superpixels (USP1) to the second set of background seeds BS2 to generate a third set of background seeds BS3. The one or more superpixels of the first set of unclassified superpixels USP1 are added based on the geodesic distances of superpixels of the first set of unclassified superpixels USP1 from the first set of foreground seeds FS1 and from the second set of background seeds BS2. The first set of unclassified superpixels USP1 includes superpixels of the plurality of superpixels other than the first set of foreground seeds FS1 and the second set of background seeds BS2. The third set of background seeds BS3 are determined by the superpixel classification module 308 as described with reference to FIG. 3.

In this example embodiment, the third set of background seeds BS3 is generated by calculating geodesic distances of superpixels of the first set of unclassified superpixels USP1 from one or more seeds of the first set of foreground seeds FS1 and from one or more seeds of the second set of background seeds BS2, determining relative geodesic distances of the superpixels of the first set of unclassified superpixels USP1 from the first set of foreground seeds FS1 and the second set of background seeds BS2 based on the geodesic distances of the superpixels of the first set of unclassified superpixels USP1 from the one or more seeds of the first set of foreground seeds FS1 and from the one or more seeds of the second set of background seeds BS2, ranking the superpixels of the first set of unclassified superpixels USP1 based on the relative geodesic distances of the superpixels of the first set of unclassified superpixels USP1, and determining the one or more superpixels based on the second threshold percentage of the superpixels of the first set of unclassified superpixels USP1.

At 532, the method 500 includes adding one or more superpixels of a second set of unclassified superpixels (USP2) to the third set of background seeds BS3 to generate a fourth set of background seeds BS4 based on applying a classifier on the second set of unclassified superpixels USP2. The second set of unclassified superpixels USP2 includes superpixels of the plurality of superpixels other than the first set of foreground seeds FS1 and the third set of background seeds BS3. The fourth set of background seeds BS4 are determined by the superpixel classification module 308 as described with reference to FIG. 3.

In this example embodiment, the fourth set of background seeds BS4 generated then constitutes the background of the input image I. In this example embodiment, the fourth set of background seeds BS4 are generated by training the classifier based on the first set of foreground seeds FS1 and the third set of background seeds BS3, applying the classifier on the second set of unclassified superpixels USP2 of the input image I to determine the one or more superpixels of the second set of unclassified superpixels USP2, and mixing the one or more superpixels of the second set of unclassified superpixels USP2 to the third set of background seeds BS3 to generate the fourth set of background seeds BS4.

In an example embodiment, a second set of foreground seeds FS2 can be generated by training the classifier based on the first set of foreground seeds FS1 and the third set of background seeds BS3, applying the classifier on the second set of unclassified superpixels USP2 of the input image I to determine the one or more superpixels of the second set of unclassified superpixels USP2, and adding the one or more superpixels of the second set of unclassified superpixels USP2 to the first set of foreground seeds FS1 to generate the second set of foreground seeds FS2.

Figure 6A:
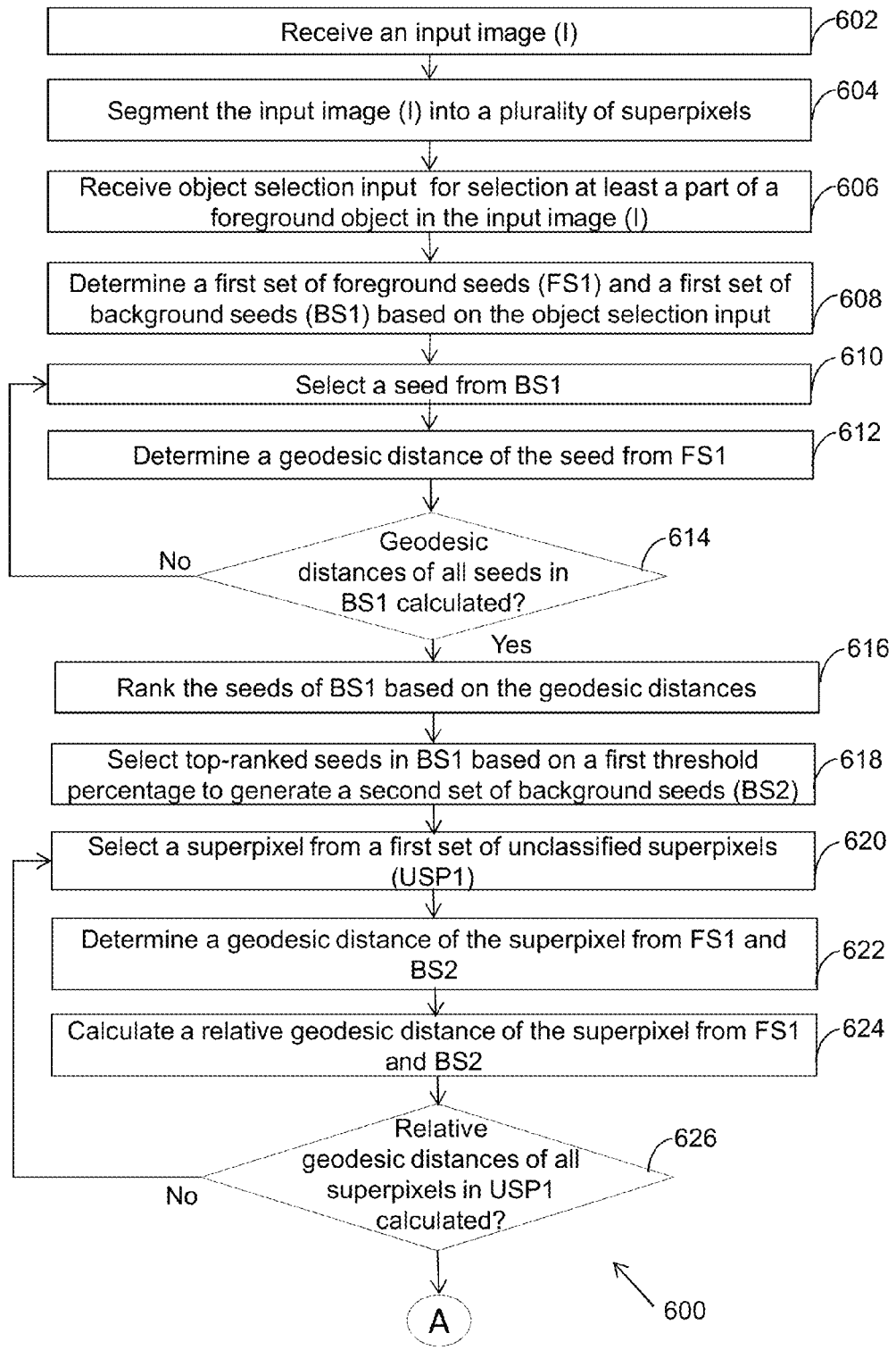
FIGS. 6A and 6B are a flowchart depicting an example method for image segmentation, in accordance with another example embodiment.
Figure 6B:
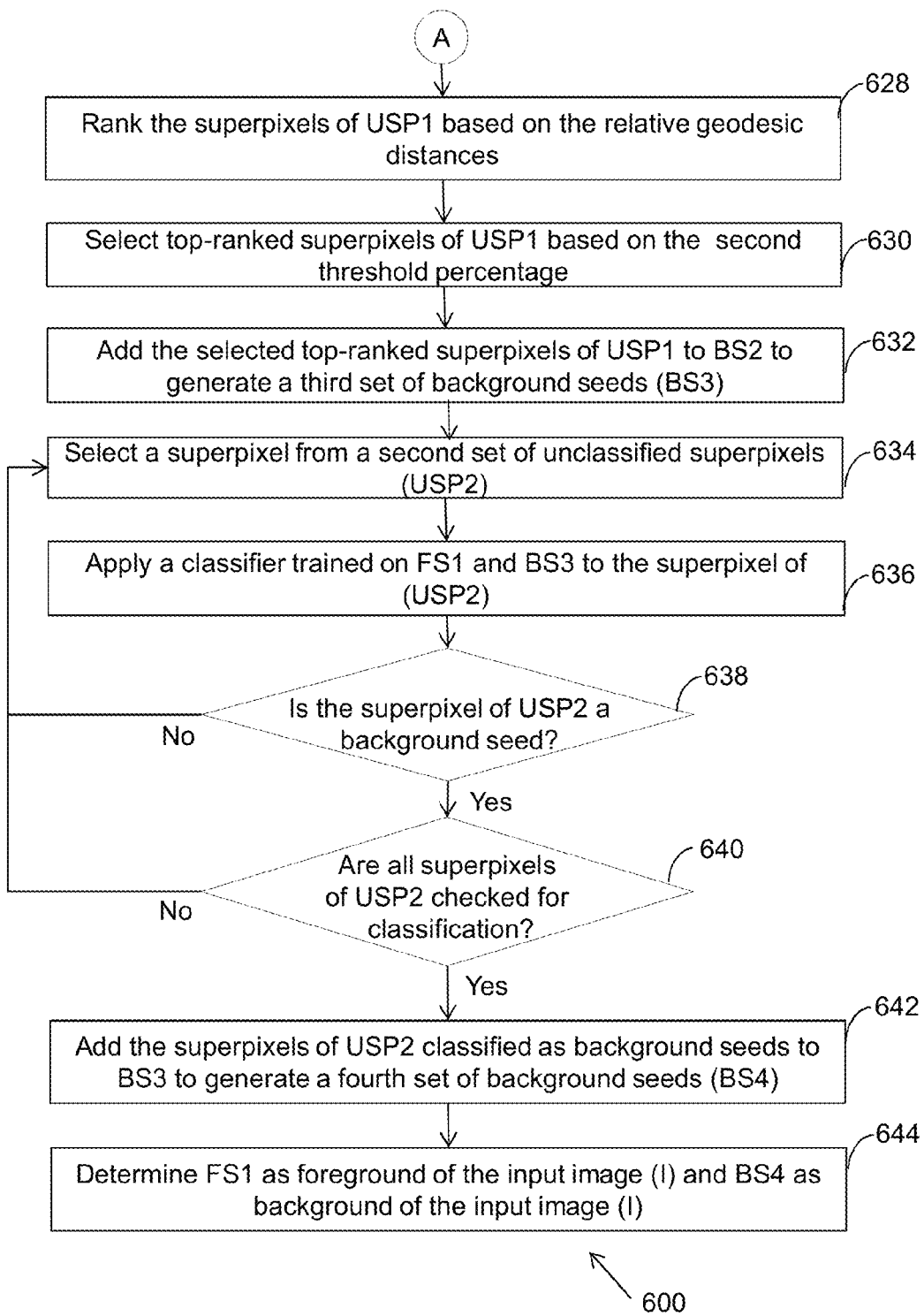

FIGS. 6A and 6B are a flowchart depicting an example method 600 for image segmentation, in accordance with another example embodiment. In an example embodiment, the method 600 includes image segmentation. The method 600 is shown and explained with reference to FIG. 2. The method 600 depicted in the flow chart may be executed by, for example, the apparatus 200 of FIG. 2.

At 602, the method 600 includes receiving an input image I. In an example embodiment, the input image I is captured by an image sensor, for example the image sensor 208.

At 604, the method 600 includes segmenting the input image I into a plurality of superpixels. In an example embodiment, the input image I is segmented into the plurality of superpixels using a segmentation method. The segmentation of the input image I is performed by a superpixel extraction module 304 which is as described in FIG. 3, and is also described with reference to FIG. 4B.

At 606, the method 600 includes receiving an object selection input from a user. In an example, the object selection input include scribbles that select at least a part of a foreground object in the input image I. In an example embodiment, the object selection input is provided by the user by using a finger input or a stylus. One example embodiment of object selection input is described with reference to FIG. 4C.

At 608, the method 600 includes determining a first set of foreground seeds FS1 and a first set of background seeds BS1. In an example embodiment, the first set of foreground seeds FS1 are superpixels that intersect with the object selection input in the input image I. The first set of foreground seeds FS1 are determined by a superpixel selection module 306 and is as described with reference to FIG. 3. In an example embodiment, the first set of background seeds BS1 are superpixels included within a pre-determined region of the input image I, for example image regions in proximity with a border of the input image I. The first set of background seeds BS1 are determined by the superpixel selection module 306 and is as described with reference to FIG. 3, and is also described with reference to FIG. 4D.

At 610, the method 600 includes selecting a seed from the first set of background seeds BS1. The seed selected from BS1 is determined by the superpixel classification module 308 and is as described with reference to FIG. 3.

At 612, the method 600 includes determining a geodesic distance of the seed from the first set of foreground seeds FS1. The geodesic distance of the seed is determined by the superpixel classification module 308 and is as described with reference to FIG. 3.

At 614, the method 600 includes checking if geodesic distances of seeds in the first set of background seeds BS1 are calculated. If geodesic distances of the seeds in the first set of background seeds BS1 are not calculated, the method goes to block 610 else 616 is performed. The geodesic distances of the seeds being calculated is checked by the superpixel classification module 308 and is as described with reference to FIG. 3.

At 616, the method 600 includes ranking the seeds in the first set of background seeds BS1 based on the geodesic distances. The seeds in BS1 are ranked by the superpixel classification module 308 as described with reference to FIG. 3.

At 618, the method 600 includes selecting top-ranked seeds in the first set of background seeds BS1 as a second set of background seeds BS2 based on a first threshold percentage. The remaining seeds are determined as noisy superpixels that do not belong to background of the input image I. The generation of BS2 is performed by the superpixel classification module 308 which is as described in FIG. 3, and is also described with reference to FIG. 4E.

At 620, the method 600 includes selecting a superpixel from a first set of unclassified superpixels USP1. The superpixel selected from USP1 is determined by the superpixel classification module 308 and is as described with reference to FIG. 3.

At 622, the method 600 includes determining a geodesic distance of the superpixel from the first set of foreground seeds FS1 and from the second set of background seeds BS2. The geodesic distance of the superpixel is determined by the superpixel classification module 308 and is as described with reference to FIG. 3.

At 624, the method 600 includes calculating a relative geodesic distance of the superpixel from first set of foreground seeds FS1 and from the second set of background seeds BS2. The relative geodesic distance of the superpixel is calculated by the superpixel classification module 308 and is as described with reference to FIG. 3.

At 626, the method 600 includes checking if relative geodesic distances of superpixels in the first set of unclassified superpixels USP1 are calculated. If relative geodesic distances of the superpixels in the first set of unclassified superpixels USP1 are not calculated, the method goes to block 620 else 628 is performed. The relative geodesic distances of the superpixels being calculated is checked by the superpixel classification module 308 and is as described with reference to FIG. 3.

At 628, the method 600 includes ranking the superpixels in the first set of unclassified superpixels USP1 based on the relative geodesic distances. The superpixels in USP1 are ranked by the superpixel classification module 308 as described with reference to FIG. 3.

At 630, the method 600 includes selecting top-ranked superpixels in the first set of unclassified superpixels USP1 based on the second threshold percentage. The top-ranked superpixels in USP1 are selected by the superpixel classification module 308 as described with reference to FIG. 3.

At 632, the method 600 includes adding the top-ranked superpixels in the first set of unclassified superpixels USP1 to the second set of background seeds BS2 to generate a third set of background seeds BS3. The generation of BS3 is performed by the superpixel classification module 308 which is as described in FIG. 3, and is also described with reference to FIG. 4F.

At 634, the method 600 includes selecting a superpixel from a second set of unclassified superpixels USP2. The superpixel in USP2 is selected by the superpixel classification module 308 as described with reference to FIG. 3.

At 636, the method 600 includes applying a classifier that is trained on the first set of foreground seeds FS1 and the third set of background seeds BS3 to the superpixel of the second set of unclassified superpixels USP2. The classifier is applied on FS1 and BS3 by the superpixel classification module 308 and is described with reference to FIG. 3.

At 638, the method 600 includes checking if the superpixel of the second set of unclassified superpixels USP2 is a background seed. If the superpixel of the second set of unclassified superpixels USP2 is not a background seed, the method 600 goes to the block 634 else 640 is performed. The superpixel of USP2 being the background seed is checked by the superpixel classification module 308 and is described with reference to FIG. 3.

At 640, the method 600 includes checking if superpixels in the second set of unclassified superpixels USP2 are checked for classification as background seeds. If the superpixels in the second set of unclassified superpixels USP2 are not checked for classification as the background seeds, the method 600 goes to the block 634 else block 642 is performed. The superpixels of USP2 being classified as the background seeds is checked by the superpixel classification module 308 and is described with reference to FIG. 3.

At 642, the method 600 includes adding the superpixels in the second set of unclassified superpixels USP2 that are classified as the background seeds to the third set of background seeds BS3 to generate a fourth set of background seeds BS4. The superpixels in USP2 are added by the superpixel classification module 308 as described with reference to FIG. 3.

At 644, the method 600 includes determining the first set of foreground seeds FS1 as a foreground of the input image I and the fourth set of background seeds BS4 as the background of the input image I. The FS1 is determined as the foreground by the superpixel classification module 308 and is as described with reference to FIG. 3. In some example embodiments, a second set of foreground seeds FS2 is determined as the foreground of the input image I, after the block 636, by first checking if the superpixel of USP2 is a foreground seed. If the superpixel of USP2 is not the foreground seed, operation of the block 634 is performed, else it is checked if superpixels of USP2 are checked for classification of foreground seeds. If the superpixels of USP2 are not checked for classification as foreground seeds then the block 634 is performed. Once, the superpixels of the USP2 are checked for the classification the superpixels in USP2 that are classified as part of the foreground seeds, are added (by the superpixel classification module 308 in FIG. 3) to FS1 to generate FS2. The FS2 is then determined as the foreground of the input image I and BS4 is determined as the background of the input image I.

It should be noted that to facilitate discussions of the flowcharts of FIGS. 5, 6A and 6B, certain operations are described herein as constituting distinct steps performed in a certain order. Such implementations are examples only and non-limiting in scope. Certain operation may be grouped together and performed in a single operation, and certain operations can be performed in an order that differs from the order employed in the examples set forth herein. Moreover, certain operations of the methods 500 and 600 are performed in an automated fashion. These operations involve substantially no interaction with the user. Other operations of the methods 500 and 600 may be performed by in a manual fashion or semi-automatic fashion. These operations involve interaction with the user via one or more user interface presentations.

The methods depicted in these flow charts may be executed by, for example, the apparatus 200 of FIG. 2. Operations of the flowchart, and combinations of operation in the flowcharts, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowchart. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a computer-implemented process such that the instructions, which execute on the computer or other programmable apparatus, provide operations for implementing the operations in the flowchart. The operations of the methods are described with help of apparatus 200. However, the operations of the methods can be described and/or practiced by using any other apparatus.

Without in any way limiting the scope, interpretation, or application of the claims appearing below, a technical effect of one or more of the example embodiments disclosed herein is to improve image segmentation of input images based on seed generation. Such seed generation is capable of distinguishing or separating foreground from background of an input image. Various example embodiments are capable of reducing amount of object selection input (scribbles) required from a user for an image segmentation algorithm. Further, various example embodiments are capable of being robust against noise and visual ambiguities due to use of superpixels that improve appearance of the input image as compared to pixels. Various example embodiments are capable of providing supervised learning to classify seeds in the seed generation. It should be noted that various example embodiments are implemented without any need of additional hardware components.

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 1 and/or 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present disclosure as defined in the appended claims.

The invention claimed is:

1. A method comprising:

facilitating receipt of a plurality of superpixels of an input image;

facilitating receipt of an object selection input for selecting at least a part of a foreground object in the input image;

determining a first set of superpixels of the plurality of superpixels as a first set of foreground seeds based on the object selection input;

determining a second set of superpixels of the plurality of superpixels as a first set of background seeds, the second set of superpixels comprised within a pre-determined region of the input image;

filtering the first set of background seeds to generate a second set of background seeds based on geodesic distances between the first set of foreground seeds and the first set of background seeds, a geodesic distance of the geodesic distances between a foreground seed and a background seed being based on a spatial distance and an appearance metric between the foreground seed and the background seed;

adding one or more superpixels of a first set of unclassified superpixels to the second set of background seeds to generate a third set of background seeds, the one or more superpixels of the first set of unclassified superpixels selected based on geodesic distances of superpixels of the first set of unclassified superpixels from the first set of foreground seeds and from the second set of background seeds, wherein the first set of unclassified superpixels comprises superpixels of the plurality of superpixels other than the first set of foreground seeds and the second set of background seeds; and adding one or more superpixels of a second set of unclassified superpixels to the third set of background seeds to generate a fourth set of background seeds based on applying a classifier on the second set of unclassified superpixels, wherein the second set of unclassified superpixels comprises superpixels of the plurality of superpixels other than the first set of foreground seeds and the third set of background seeds.

2. The method as claimed in claim 1, further comprising segmenting the fourth set of background seeds as a background of the input image.

3. The method as claimed in claim 1, wherein filtering the first set of background seeds comprises:
   calculating geodesic distances of seeds of the first set of background seeds from one or more seeds of the first set of foreground seeds;
   ranking the seeds of the first set of background seeds based on the geodesic distances of the seeds of the first set of background seeds; and
   determining a first threshold percentage of the first set of background seeds as the second set of background seeds based on the ranking of the seeds of the first set of background seeds.

4. The method as claimed in claim 1, wherein adding the one or more superpixels of the first set of unclassified superpixels to the second set of background superpixels to generate the third set of background superpixels comprises:
   calculating geodesic distances of superpixels of the first set of unclassified superpixels from one or more seeds of the first set of foreground seeds and from one or more seeds of the second set of background seeds;
   determining relative geodesic distances of the superpixels of the first set of unclassified superpixels from the first set of foreground seeds and the second set of background seeds based on the geodesic distances of the superpixels of the first set of unclassified superpixels from the one or more seeds of the first set of foreground seeds and from the one or more seeds of the second set of background seeds;
   ranking the superpixels of the first set of unclassified superpixels based on the relative geodesic distances of the superpixels of the first set of unclassified superpixels; and
   selecting the one or more superpixels of the first set of unclassified superpixels based on a second threshold percentage of the superpixels of the first set of unclassified superpixels.

5. The method as claimed in claim 1, wherein adding the one or more superpixels of the second set of unclassified superpixels to the third set of background seeds to generate the fourth set of background seeds comprises:
   training the classifier based on the first set of foreground seeds and the third set of background seeds;
   applying the classifier on the second set of unclassified superpixels of the input image to determine the one or more superpixels of the second set of unclassified superpixels; and
   mixing the one or more superpixels of the second set of unclassified superpixels to the third set of background seeds to generate the fourth set of background seeds.

6. The method as claimed in claim 1, further comprising:
   training the classifier based on the first set of foreground seeds and the third set of background seeds;
   applying the classifier on the second set of unclassified superpixels of the input image to determine the one or more superpixels of the second set of unclassified superpixels; and
   adding the one or more superpixels of the second set of unclassified superpixels to the first set of foreground seeds to generate a second set of foreground seeds.

7. The method as claimed in claim 1, wherein determining the first set of superpixels of the plurality of superpixels comprises determining superpixels that intersect with the object selection input.

8. An apparatus comprising:
   at least one processor; and
   at least one memory comprising computer program code, the at least one memory and the computer program code configured to, with the at least one processor, cause the apparatus to at least perform:
      facilitate receipt of a plurality of superpixels of an input image;
      facilitate receipt of an object selection input for selecting at least a part of a foreground object in the input image;
      determine a first set of superpixels of the plurality of superpixels as a first set of foreground seeds based on the object selection input;
      determine a second set of superpixels of the plurality of superpixels as a first set of background seeds, the second set of superpixels comprised within a predetermined region of the input image;
      filter the first set of background seeds to generate a second set of background seeds based on geodesic distances between the first set of foreground seeds and the first set of background seeds, a geodesic distance of the geodesic distances between a foreground seed and a background seed being based on a spatial distance and an appearance metric between the foreground seed and the background seed;
      add one or more superpixels of a first set of unclassified superpixels to the second set of background seeds to generate a third set of background seeds, the one or more superpixels of the first set of unclassified superpixels selected based on the geodesic distances of superpixels of the first set of unclassified superpixels from the first set of foreground seeds and from the second set of background seeds, wherein the first set of unclassified superpixels comprises superpixels of the plurality of superpixels other than the first set of foreground seeds and the second set of background seeds; and
      add one or more superpixels of a second set of unclassified superpixels to the third set of background seeds to generate a fourth set of background seeds based on applying a classifier on the second set of unclassified superpixels, wherein the second set of unclassified superpixels comprises superpixels of the plurality of superpixels other than the first set of foreground seeds and the third set of background seeds.

9. The apparatus as claimed in claim 8, wherein the apparatus is further caused, at least in part to:
   segment the fourth set of background seeds as a background of the input image.

10. The apparatus as claimed in claim 8, wherein for filtering the first set of background seeds, the apparatus is further caused, at least in part to:
   calculate geodesic distances of seeds of the first set of background seeds from one or more seeds of the first set of foreground seeds;
   rank the seeds of the first set of background seeds based on the geodesic distances of the seeds of the first set of background seeds; and determine a first threshold percentage of the first set of background seeds as the second set of background seeds based on the ranking of the seeds of the first set of background seeds.

11. The apparatus as claimed in claim 8, wherein for adding the one or more superpixels of the first set of unclassified superpixels to the second set of background superpixels to generate the third set of background superpixels, the apparatus is further caused, at least in part to:

calculate geodesic distances of superpixels of the first set of unclassified superpixels from one or more seeds of the first set of foreground seeds and from one or more seeds of the second set of background seeds;

determine relative geodesic distances of the superpixels of the first set of unclassified superpixels from the first set of foreground seeds and the second set of background seeds based on the geodesic distances of the superpixels of the first set of unclassified superpixels from the one or more seeds of the first set of foreground seeds and from the one or more seeds of the second set of background seeds;

rank the superpixels of the first set of unclassified superpixels based on the relative geodesic distances of the superpixels of the first set of unclassified superpixels; and select the one or more superpixels of the first set of unclassified superpixels based on a second threshold percentage of the superpixels of the first set of unclassified superpixels.

12. The apparatus as claimed in claim 8, wherein for adding the one or more superpixels of the second set of unclassified superpixels to the third set of background seeds to generate the fourth set of background seeds, the apparatus is further caused, at least in part to:

train the classifier based on the first set of foreground seeds and the third set of background seeds;

apply the classifier on the second set of unclassified superpixels of the input image to determine the one or more superpixels of the second set of unclassified superpixels; and mix the one or more superpixels of the second set of unclassified superpixels to the third set of background seeds to generate the fourth set of background seeds.

13. The apparatus as claimed in claim 8, wherein the apparatus is further caused, at least in part to:

train the classifier based on the first set of foreground seeds and the third set of background seeds;

apply the classifier on the second set of unclassified superpixels of the input image to determine the one or more superpixels of the second set of unclassified superpixels; and add the one or more superpixels of the second set of unclassified superpixels to the first set of foreground seeds to generate a second set of foreground seeds.

14. The apparatus as claimed in claim 8, wherein for determining the first set of superpixels of the plurality of superpixels, the apparatus is further caused, at least in part to determine superpixels that intersect with the object selection input.

15. A computer program product comprising at least one non-transitory computer-readable storage medium, the non-transitory computer-readable storage medium comprising a set of instructions, which, when executed by one or more processors, cause an apparatus to at least perform: facilitate receipt of a plurality of superpixels of an input image; facilitate receipt of an object selection input for selecting at least a part of a foreground object in the input image; determine a first set of superpixels of the plurality of superpixels as a first set of foreground seeds based on the object selection input; determine a second set of superpixels of the plurality of superpixels as a first set of background seeds, the second set of superpixels comprised within a pre-determined region of the input image; filter the first set of background seeds to generate a second set of background seeds based on geodesic distances between the first set of foreground seeds and the first set of background seeds, a geodesic distance of the geodesic distances between a foreground seed and a background seed being based on a spatial distance and an appearance metric between the foreground seed and the background seed; add one or more superpixels of a first set of unclassified superpixels to the second set of background seeds to generate a third set of background seeds, the one or more superpixels of the first set of unclassified superpixels selected based on the geodesic distances of superpixels of the first set of unclassified superpixels from the first set of foreground seeds and from the second set of background seeds, wherein the first set of unclassified superpixels comprises superpixels of the plurality of superpixels other than the first set of foreground seeds and the second set of background seeds; and add one or more superpixels of a second set of unclassified superpixels to the third set of background seeds to generate a fourth set of background seeds based on applying a classifier on the second set of unclassified superpixels, wherein the second set of unclassified superpixels comprises superpixels of the plurality of superpixels other than the first set of foreground seeds and the third set of background seeds.

16. The computer program product as claimed in claim 15, wherein the apparatus is further caused, at least in part to:

segment the fourth set of background seeds as a background of the input image.

17. The computer program product as claimed in claim 15, wherein for filtering the first set of background seeds, the apparatus is further caused, at least in part to:

calculate geodesic distances of seeds of the first set of background seeds from one or more seeds of the first set of foreground seeds;

rank the seeds of the first set of background seeds based on the geodesic distances of the seeds of the first set of background seeds; and determine a first threshold percentage of the first set of background seeds as the second set of background seeds based on the ranking of the seeds of the first set of background seeds.

18. The computer program product as claimed in claim 15, wherein for adding the one or more superpixels of the first set of unclassified superpixels to the second set of background superpixels to generate the third set of background superpixels, the apparatus is further caused, at least in part to:

calculate geodesic distances of superpixels of the first set of unclassified superpixels from one or more seeds of the first set of foreground seeds and from one or more seeds of the second set of background seeds;

determine relative geodesic distances of the superpixels of the first set of unclassified superpixels from the first set of foreground seeds and the second set of background seeds based on the geodesic distances of the superpixels of the first set of unclassified superpixels from the one or more seeds of the first set of foreground seeds and from the one or more seeds of the second set of background seeds;

rank the superpixels of the first set of unclassified superpixels based on the relative geodesic distances of the superpixels of the first set of unclassified superpixels; and select the one or more superpixels of the first set of unclassified superpixels based on a second threshold percentage of the superpixels of the first set of unclassified superpixels.

19. The computer program product as claimed in claim 15, wherein for adding the one or more superpixels of the second set of unclassified superpixels to the third set of background seeds to generate the fourth set of background seeds, the apparatus is further caused, at least in part to:

train the classifier based on the first set of foreground seeds and the third set of background seeds;

apply the classifier on the second set of unclassified superpixels of the input image to determine the one or more superpixels of the second set of unclassified superpixels; and mix the one or more superpixels of the second set of unclassified superpixels to the third set of background seeds to generate the fourth set of background seeds.

20. The computer program product as claimed in claim 15, wherein the apparatus is further caused, at least in part to:

train the classifier based on the first set of foreground seeds and the third set of background seeds;

apply the classifier on the second set of unclassified superpixels of the input image to determine the one or more superpixels of the second set of unclassified superpixels; and add the one or more superpixels of the second set of unclassified superpixels to the first set of foreground seeds to generate a second set of foreground seeds.

21. The computer program product as claimed in claim 15, wherein for determining the first set of superpixels of the plurality of superpixels, the apparatus is further caused, at least in part to determine superpixels that intersect with the object selection input.

* * * * *